United States Patent
Kemmochi et al.

(10) Patent No.: US 10,572,779 B2
(45) Date of Patent: Feb. 25, 2020

(54) ELECTRONIC INFORMATION BOARD APPARATUS, INFORMATION PROCESSING METHOD, AND COMPUTER PROGRAM PRODUCT

(71) Applicant: Ricoh Company, Ltd., Tokyo (JP)

(72) Inventors: Eiji Kemmochi, Tokyo (JP); Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 114 days.

(21) Appl. No.: 15/632,578

(22) Filed: Jun. 26, 2017

(65) Prior Publication Data

US 2017/0293826 A1  Oct. 12, 2017

Related U.S. Application Data

(63) Continuation of application No. PCT/JP2016/000207, filed on Jan. 15, 2016.

(30) Foreign Application Priority Data

Jan. 20, 2015 (JP) ................................. 2015-008608

(51) Int. Cl.
*G06K 9/00* (2006.01)
*G06K 9/72* (2006.01)
(Continued)

(52) U.S. Cl.
CPC .............. *G06K 9/72* (2013.01); *B43L 1/04* (2013.01); *G06F 3/04883* (2013.01);
(Continued)

(58) Field of Classification Search
None
See application file for complete search history.

(56) References Cited

U.S. PATENT DOCUMENTS 6,826,724 B1  11/2004 Shimada et al.
7,194,471 B1   3/2007 Nagatsuka et al.
(Continued)

FOREIGN PATENT DOCUMENTS

CN   1689028 A  10/2005
CN 102141892 A   8/2011
(Continued)

OTHER PUBLICATIONS

U.S. Appl. No. 10/976,991, filed Nov. 1, 2004.
(Continued)

*Primary Examiner* — Sean M Conner
(74) *Attorney, Agent, or Firm* — Xsensus LLP

(57) ABSTRACT

An electronic information board apparatus includes: a guide generating unit configured to display a handwriting region on a screen; a coordinate detecting unit configured to detect coordinates of an indication body moving in the handwriting region on the screen; an image drawing unit configured to generate a stroke image based on the coordinates and display the generated stroke image in the handwriting region on a first layer of the screen; a character recognizing unit configured to execute character recognition based on a handwritten image that is hand-written inside the handwriting region and outputs text data; and a display superimposing unit configured to display the text data acquired from the character recognizing unit at a position that is approximately the same as that of the hand-written image that is hand-written inside the handwriting region on the screen, and on a second layer of the screen different from the first layer.

8 Claims, 15 Drawing Sheets

| SEQ | OPERA-TION NAME | TRANSMISSION SOURCE IP ADDRESS: Port No. | TRANSMISSION DESTINATION IP ADDRESS: Port No. | OPERA-TION TYPE | OPERATION TARGET (PAGE DATA ID/ STROKE DATA ID) | DATA |
|---|---|---|---|---|---|---|
| 1 | ADD | 192.0.0.1:50001 | 192.0.0.1:50000 | STROKE | p005 | ...... (STROKE DATA) |
| 2 | ADD | 192.0.0.1:50000 | 192.0.0.2:50001 | STROKE | p005 | ...... (STROKE DATA) |
| 3 | UPDATE | 192.0.0.2:50001 | 192.0.0.1:50000 | STROKE | p006 | (50,40) |
| 4 | UPDATE | 192.0.0.1:50000 | 192.0.0.1:50001 | STROKE | p006 | (50,40) |
| 5 | DELETE | 192.0.0.2:50001 | 192.0.0.1:50000 | STROKE | p007 | - |
| 6 | DELETE | 192.0.0.1:50000 | 192.0.0.1:50001 | STROKE | p007 | - |
| 7 | ADD | 192.0.0.1:50001 | 192.0.0.1:50000 | PAGE | - | - |
| 8 | ADD | 192.0.0.1:50000 | 192.0.0.2:50001 | PAGE | - | - |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| . | . | . | . | . | . | . |

(51) Int. Cl.
  *B43L 1/04*    (2006.01)
  *G06F 3/0488*  (2013.01)
  *G06K 9/78*    (2006.01)

(52) U.S. Cl.
  CPC ..... *G06K 9/00402* (2013.01); *G06K 9/00422* (2013.01); *G06K 9/78* (2013.01); *G06K 2209/01* (2013.01)

(56) References Cited

U.S. PATENT DOCUMENTS

| | | |
|---|---|---|
| 2005/0175242 A1 | 8/2005 | Tanaka |
| 2006/0012561 A1 | 1/2006 | Halcrow et al. |
| 2007/0050325 A1 | 3/2007 | Nakatomi et al. |
| 2007/0051793 A1 | 3/2007 | Katoh et al. |
| 2007/0136288 A1 | 6/2007 | Shimada et al. |
| 2008/0072225 A1 | 3/2008 | Nagatsuka et al. |
| 2009/0231637 A1 | 9/2009 | Kemmochi et al. |
| 2011/0229039 A1* | 9/2011 | Kitada ............... G06K 9/00174 382/187 |
| 2012/0032925 A1 | 2/2012 | Sekiya |
| 2012/0050197 A1 | 3/2012 | Kemmochi |
| 2012/0263381 A1* | 10/2012 | Yoshida ............. G06F 3/03545 382/189 |
| 2013/0147736 A1 | 6/2013 | Sakuramata et al. |
| 2013/0257905 A1 | 10/2013 | Kemmochi |
| 2013/0283198 A1 | 10/2013 | Kemmochi et al. |
| 2014/0040767 A1 | 2/2014 | Bolia |
| 2014/0247463 A1 | 9/2014 | Kemmochi et al. |
| 2014/0304586 A1 | 10/2014 | Hirabayashi |
| 2015/0002484 A1 | 1/2015 | Case et al. |
| 2015/0030249 A1 | 1/2015 | Zhen et al. |

FOREIGN PATENT DOCUMENTS

| | | |
|---|---|---|
| CN | 102156609 A | 8/2011 |
| CN | 102194136 A | 9/2011 |
| CN | 104252312 A | 12/2014 |
| JP | 06-284240 | 10/1994 |
| JP | 2000-043485 | 2/2000 |
| JP | 2001-026195 | 1/2001 |
| JP | 2010-239469 | 10/2010 |
| JP | 2012-043251 | 3/2012 |
| JP | 2013-097737 | 5/2013 |
| JP | 2013097737 A * | 5/2013 |
| WO | 2010119603 A1 | 10/2010 |

OTHER PUBLICATIONS

International Search Report dated Mar. 8, 2016 in PCT/JP2016/000207 filed Jan. 15, 2016.
Written Opinion dated Mar. 8, 2016 in PCT/JP2016/000207 filed Jan. 15, 2016.
Extended European Search Report dated Jan. 3, 2018 in Patent Application No. 16739931.0, citing references AA—AC therein, 7 pages.
Office Action dated Sep. 30, 2019, issued in corresponding Chinese Patent Application No. 201680006397.2 with English Translation, 16 pages.

* cited by examiner

[Fig. 1]
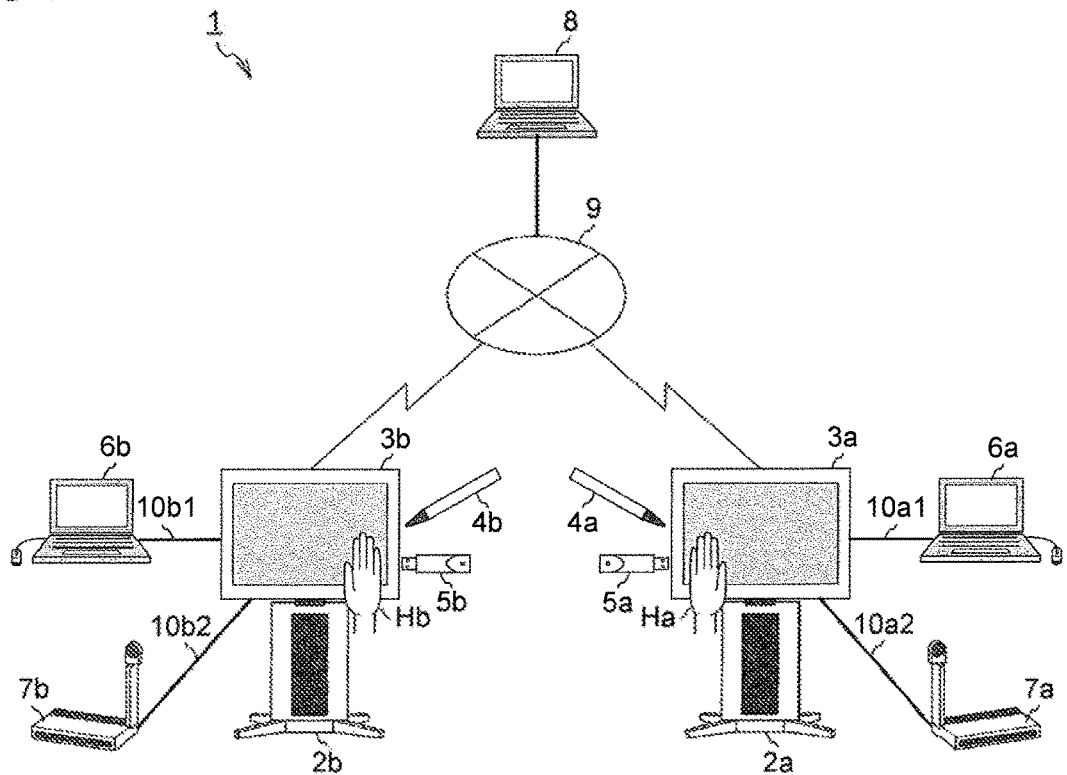
[Fig. 2]
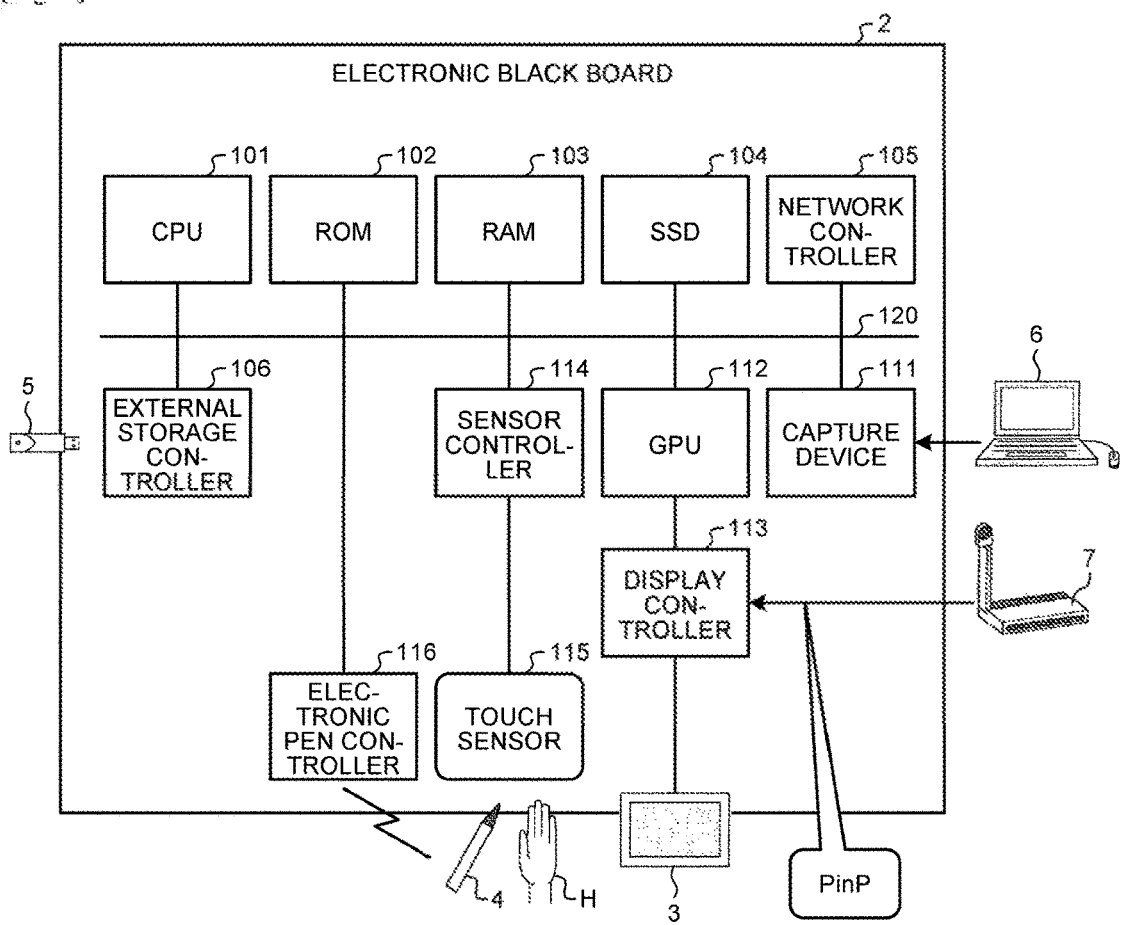

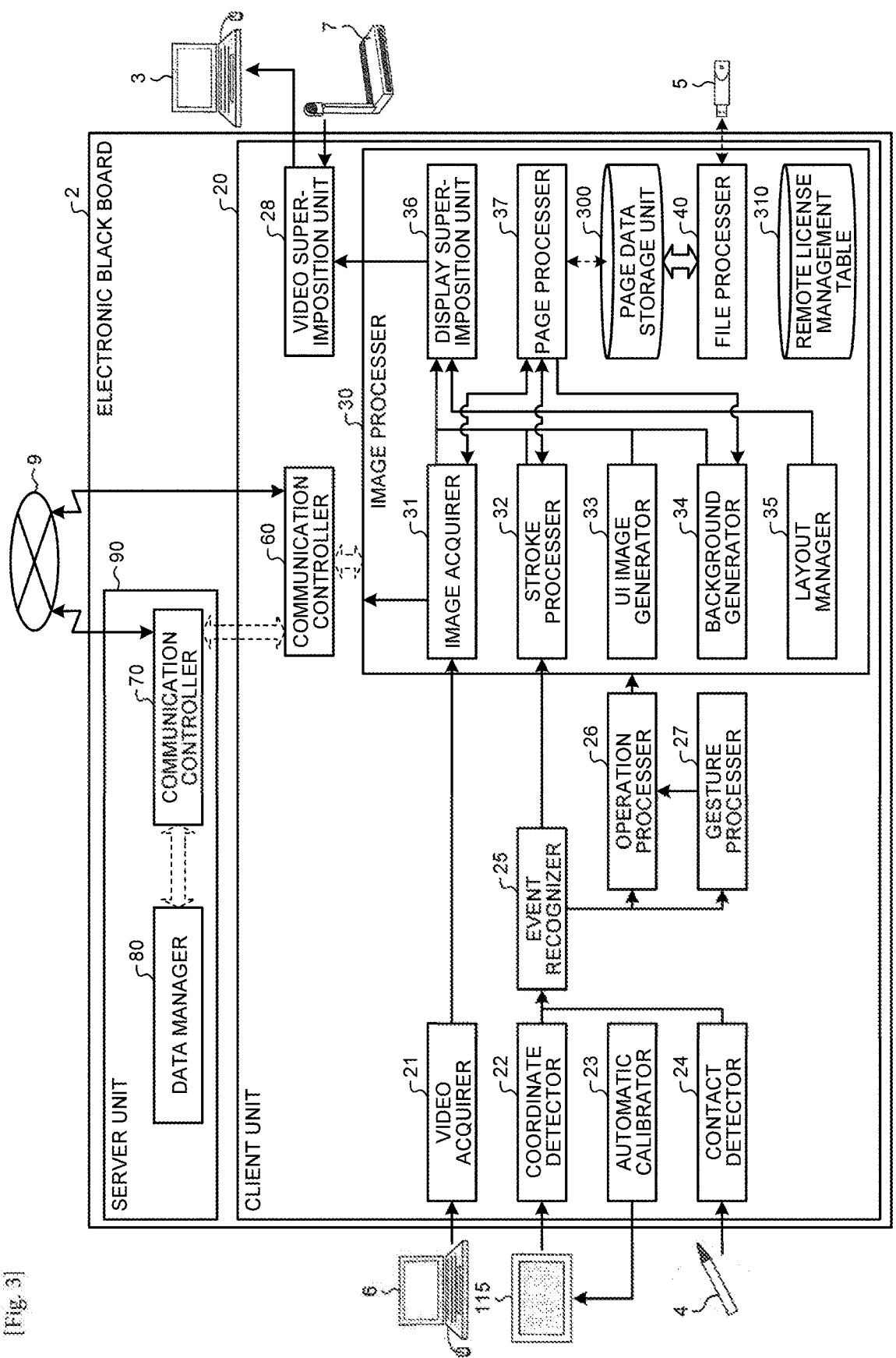
[Fig. 3]

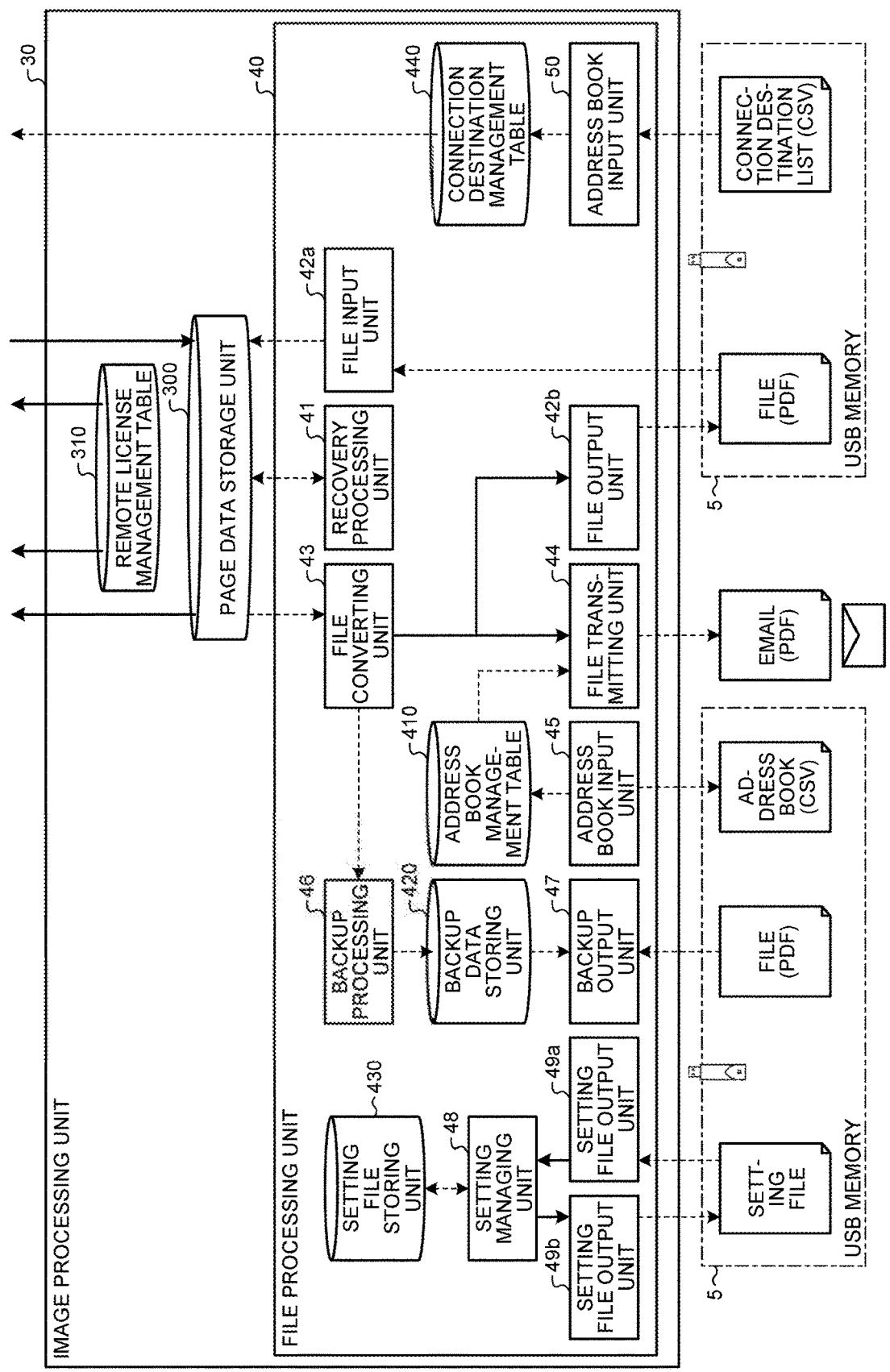
[Fig. 4]

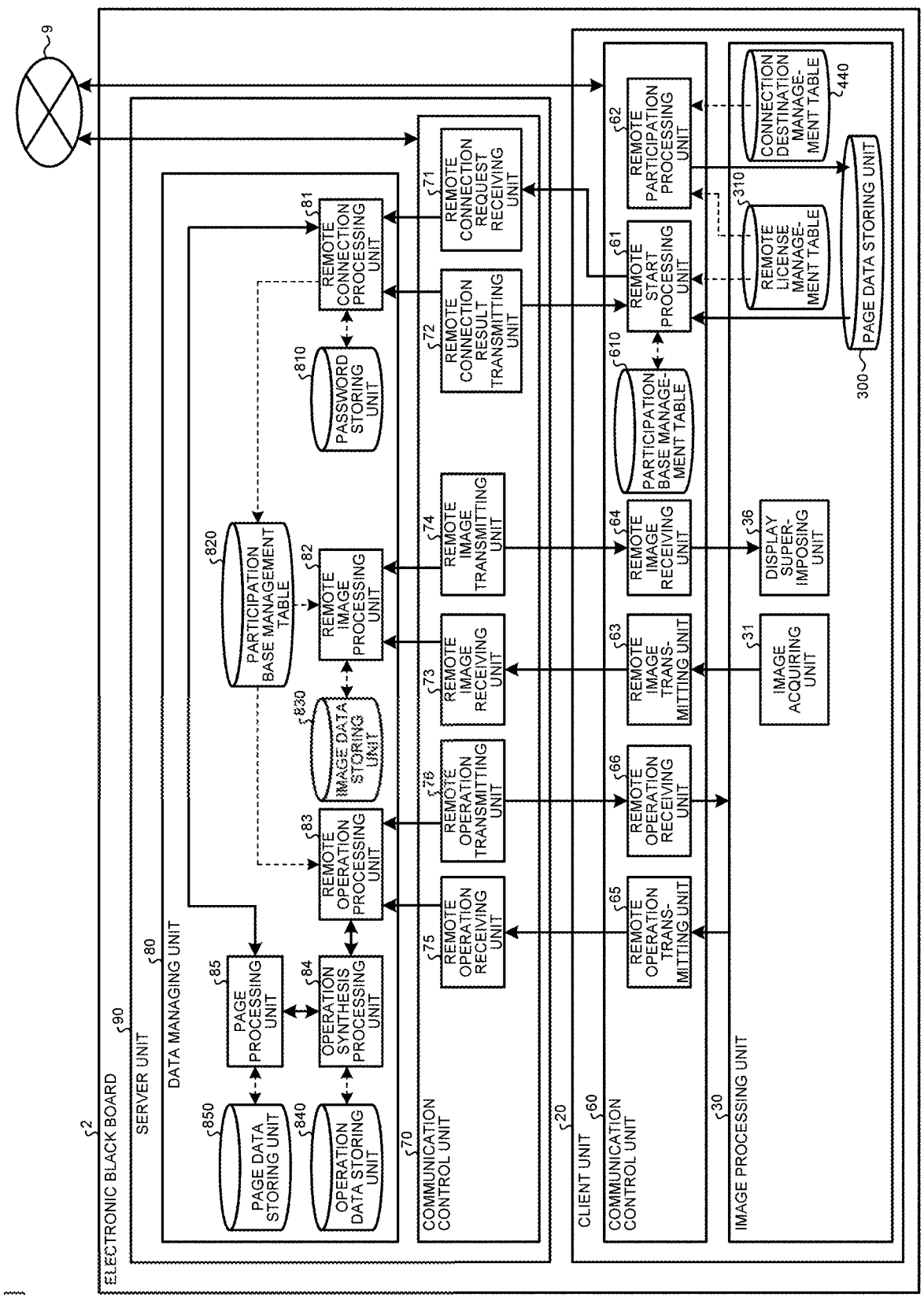
[Fig. 5]

[Fig. 6]

| PAGE DATA ID | START TIME | END TIME | STROKE ARRAY DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

| STROKE DATA ID | START TIME | END TIME | COLOR | WIDTH | COORDINATE ARRAY DATA ID |
|---|---|---|---|---|---|
| st001 | 20130610102502 | 20130610102505 | ff0000 | 2 | st001 |
| st002 | 20130610102612 | 20130610102615 | 000ff0 | 3 | st002 |
| st003 | 20130610102704 | 20130610102712 | 0 | 1 | st003 |
| ⋮ | ⋮ | ⋮ | ⋮ | ⋮ | ⋮ |

| X COORDINATE VALUE | Y COORDINATE VALUE | DIFFERENCE TIME | WRITING PRESSURE |
|---|---|---|---|
| 10 | 10 | 100 | 255 |
| 12 | 10 | 200 | 255 |
| 14 | 12 | 300 | 255 |
| ⋮ | ⋮ | ⋮ | ⋮ |

[Fig. 9]

| MEDIA DATA ID | DATA TYPE | RECORDING TIME | X COORDINATE VALUE | Y COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ⋮ | ⋮ | ⋮ | ⋮ | ⋮ | ⋮ | ⋮ | ⋮ |

[Fig. 10]

| PRODUCT ID | LICENSE ID | VALIDITY PERIOD |
|---|---|---|
| 1001 | 12345678abcdefgh | 2012/12/31 |
| 1001 | 4321dcba8765hgfe | - |
| ⋮ | ⋮ | ⋮ |

[Fig. 11]

| NAME | MAIL ADDRESS |
|---|---|
| TARO | taro@alpha.co.jp |
| HANAKO | hanako@beta.co.jp |
| HANAKO | jiro@gamma.co.jp |
| ⋮ | ⋮ |

[Fig. 12]

| |
|---|
| iwb-20130610104423.pdf |
| iwb-20130625152245.pdf |
| iwb-20130628113418.pdf |
| ⋮ |

[Fig. 13]

| NAME | IP ADDRESS |
|---|---|
| CONFERENCE ROOM 1 | 192.0.0.1 |
| CONFERENCE ROOM 2 | 192.0.0.2 |
| - | 192.0.0.3 |
| ⋮ | ⋮ |

[Fig. 14]

| NAME | IP ADDRESS |
|---|---|
| CONFERENCE ROOM 1 | 192.0.0.1 |
| CONFERENCE ROOM 2 | 192.0.0.2 |
| - | 192.0.0.8 |
| ⋮ | ⋮ |

[Fig. 15]
| SEQ | OPERA-TION NAME | TRANSMISSION SOURCE IP ADDRESS: Port No. | TRANSMISSION DESTINATION IP ADDRESS: Port No. | OPERA-TION TYPE | OPERATION TARGET (PAGE DATA ID/ STROKE DATA ID) | DATA |
|---|---|---|---|---|---|---|
| 1 | ADD | 192.0.0.1:50001 | 192.0.0.1:50000 | STROKE | p005 | ..... (STROKE DATA) |
| 2 | ADD | 192.0.0.1:50000 | 192.0.0.2:50001 | STROKE | p005 | ..... (STROKE DATA) |
| 3 | UPDATE | 192.0.0.2:50001 | 192.0.0.1:50000 | STROKE | p006 | (50,40) |
| 4 | UPDATE | 192.0.0.1:50000 | 192.0.0.1:50001 | STROKE | p006 | (50,40) |
| 5 | DELETE | 192.0.0.2:50001 | 192.0.0.1:50000 | STROKE | p007 | - |
| 6 | DELETE | 192.0.0.1:50000 | 192.0.0.1:50001 | STROKE | p007 | - |
| 7 | ADD | 192.0.0.1:50001 | 192.0.0.1:50000 | PAGE | - | - |
| 8 | ADD | 192.0.0.1:50000 | 192.0.0.2:50001 | PAGE | - | - |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ⋮ | ⋮ | ⋮ | ⋮ | ⋮ | ⋮ | ⋮ |
[Fig. 16]
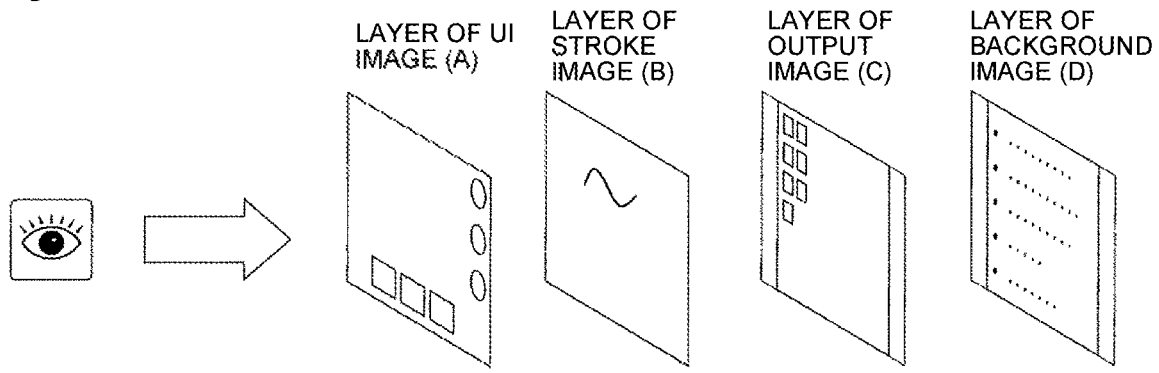

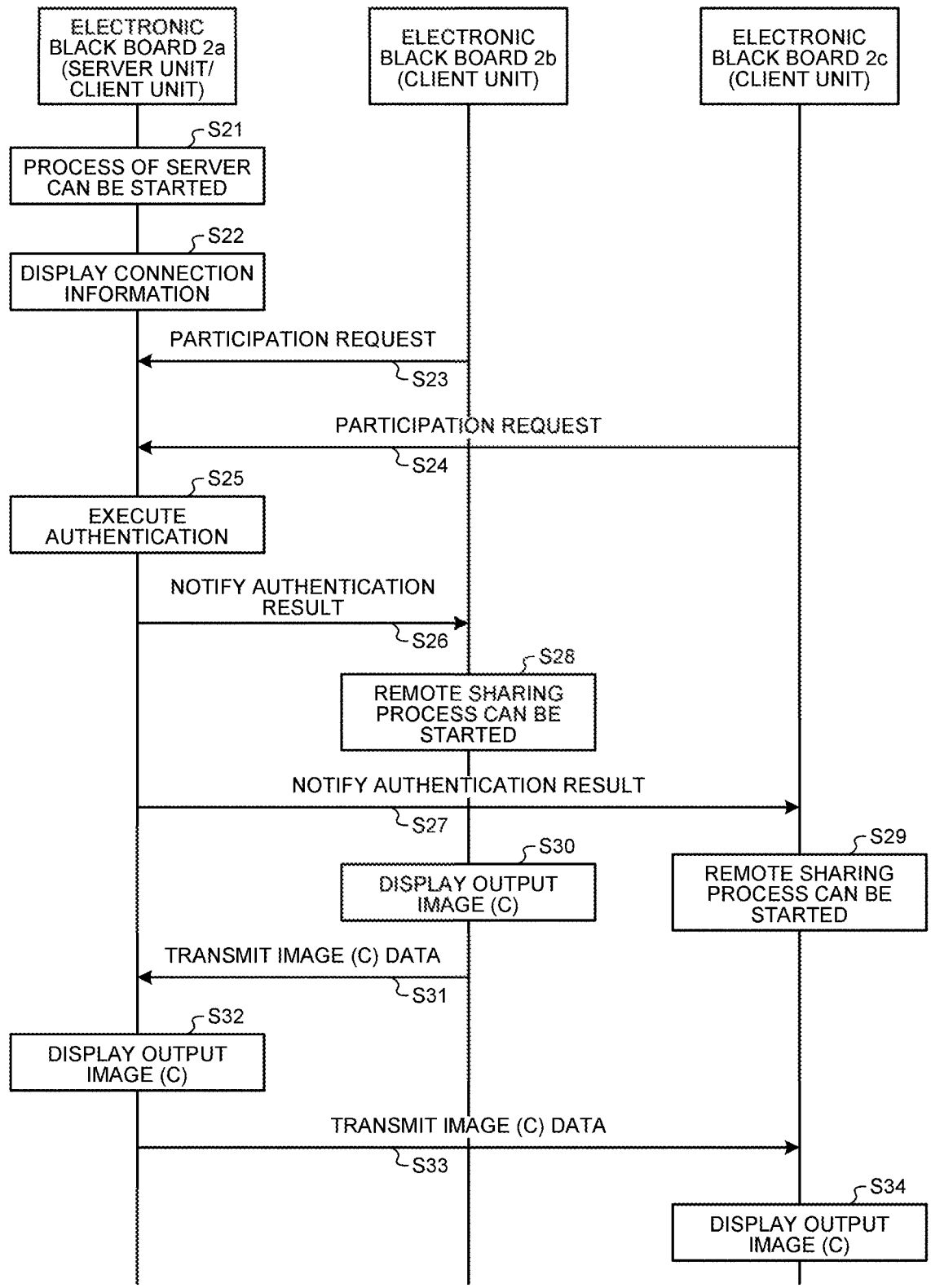
[Fig. 17]

[Fig. 18]
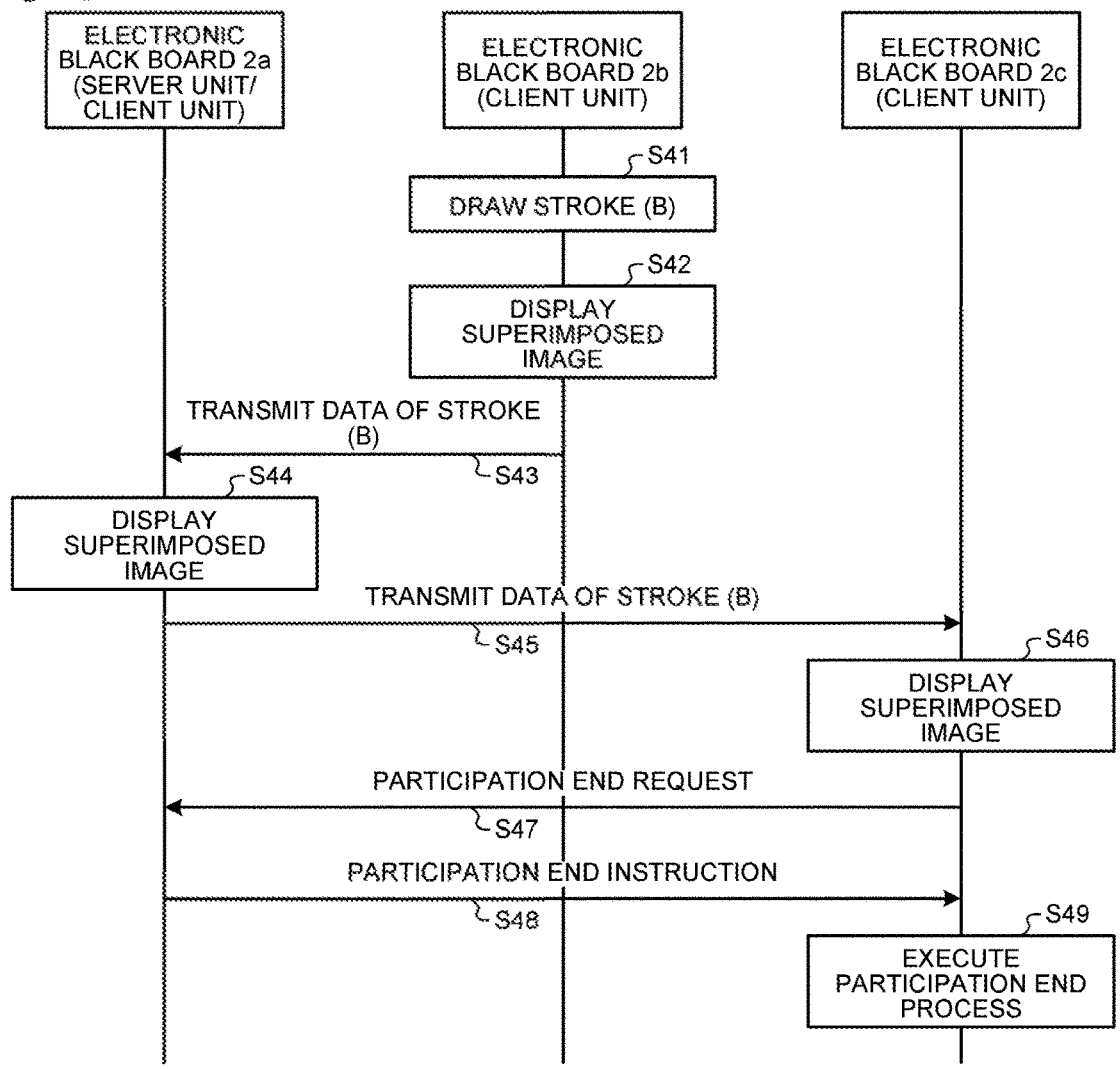
[Fig. 19]
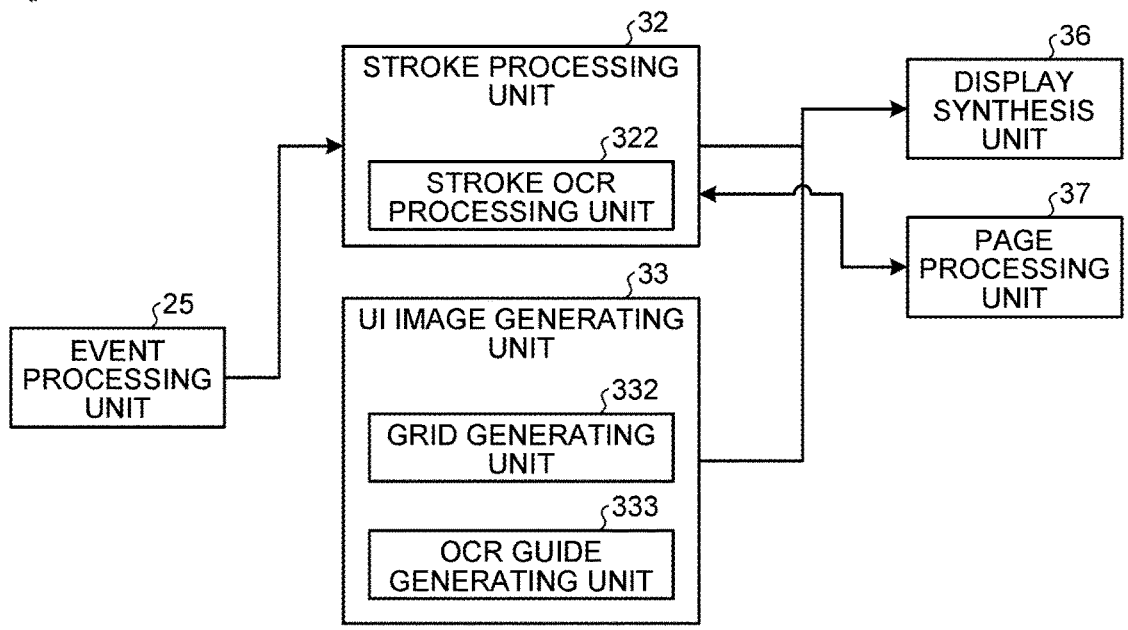

[Fig. 20]
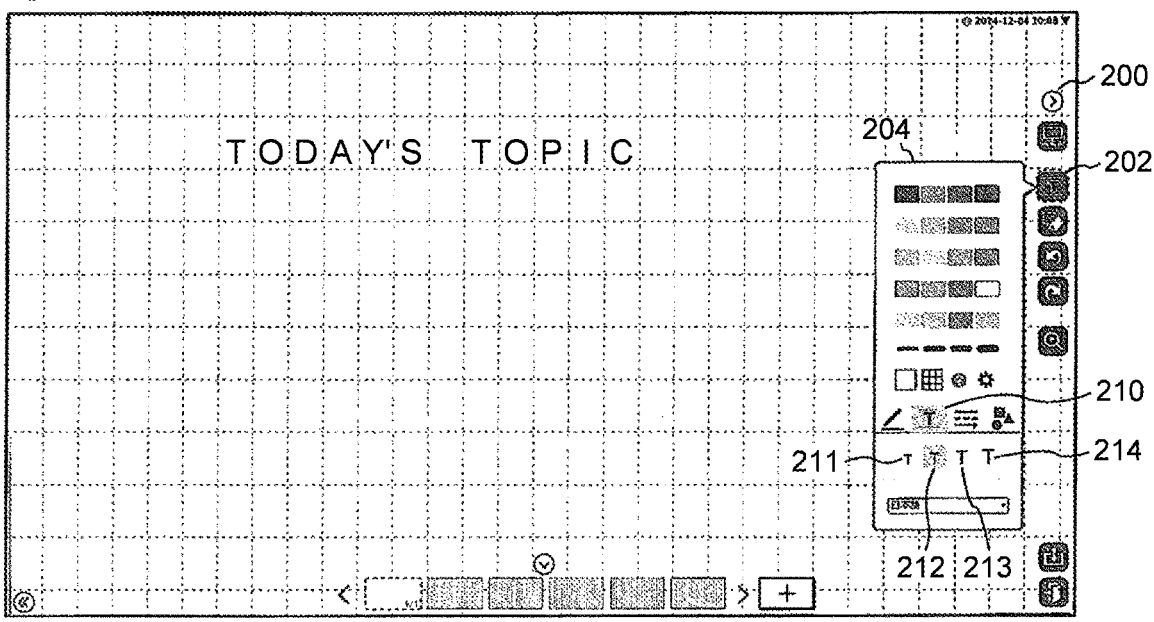
[Fig. 21]
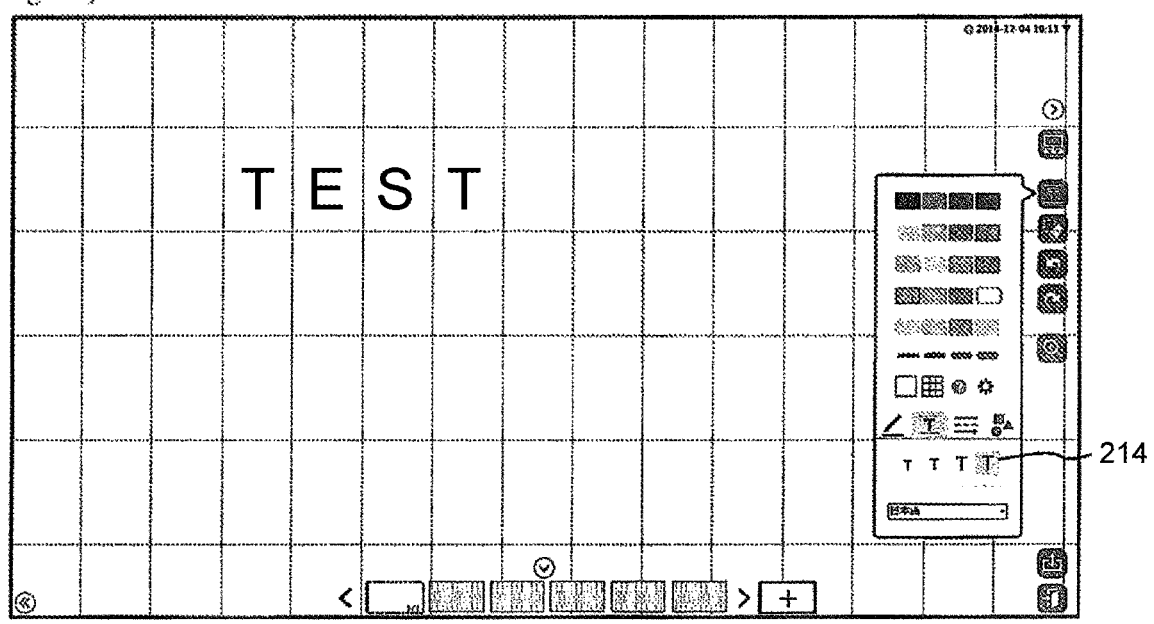

[Fig. 22]
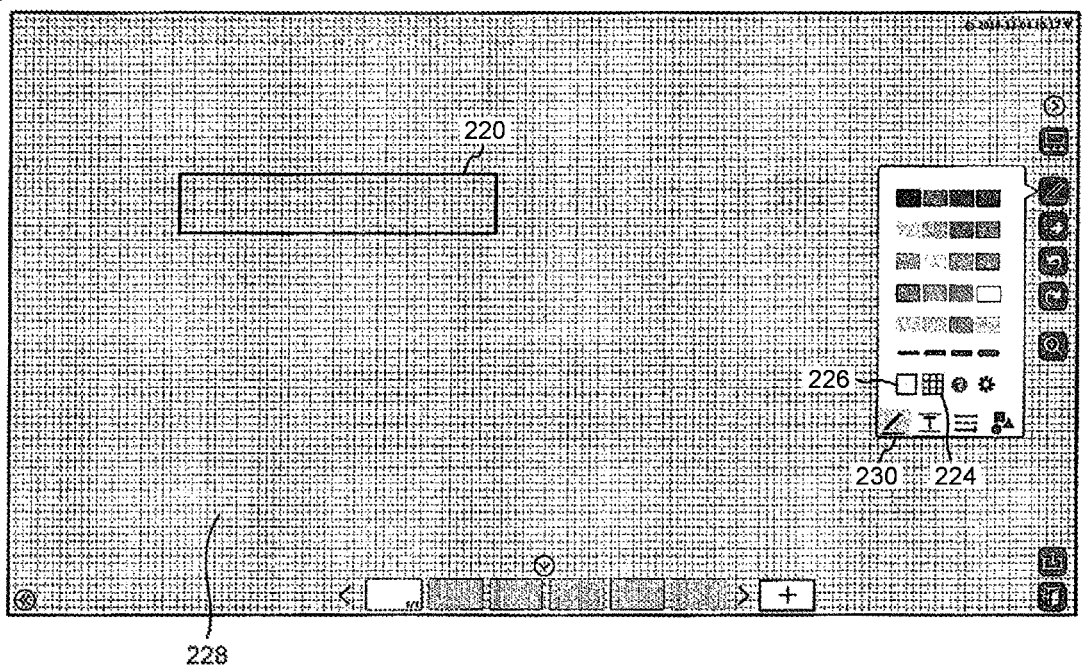
[Fig. 23]
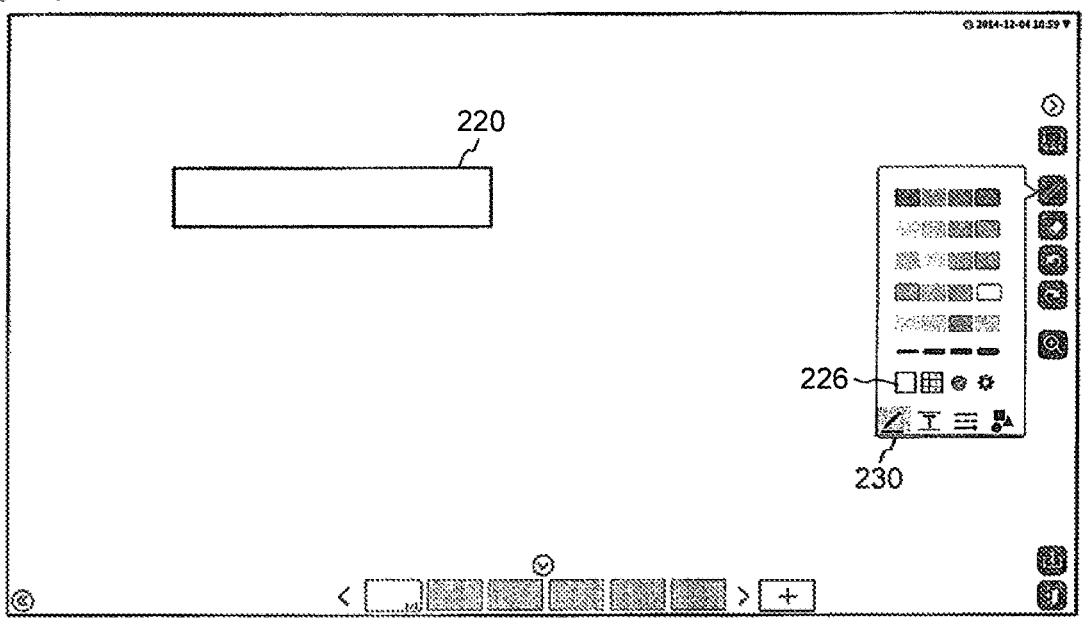

[Fig. 24A]
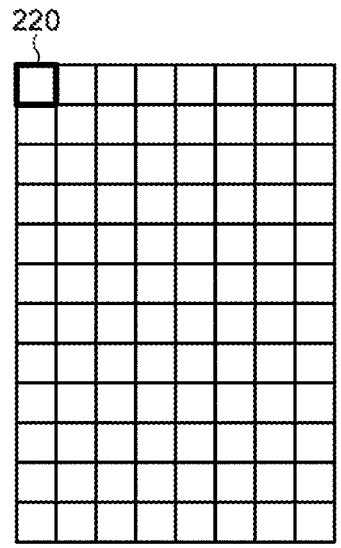
[Fig. 24B]
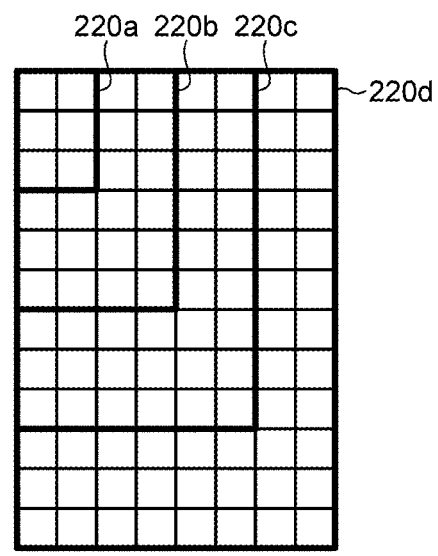

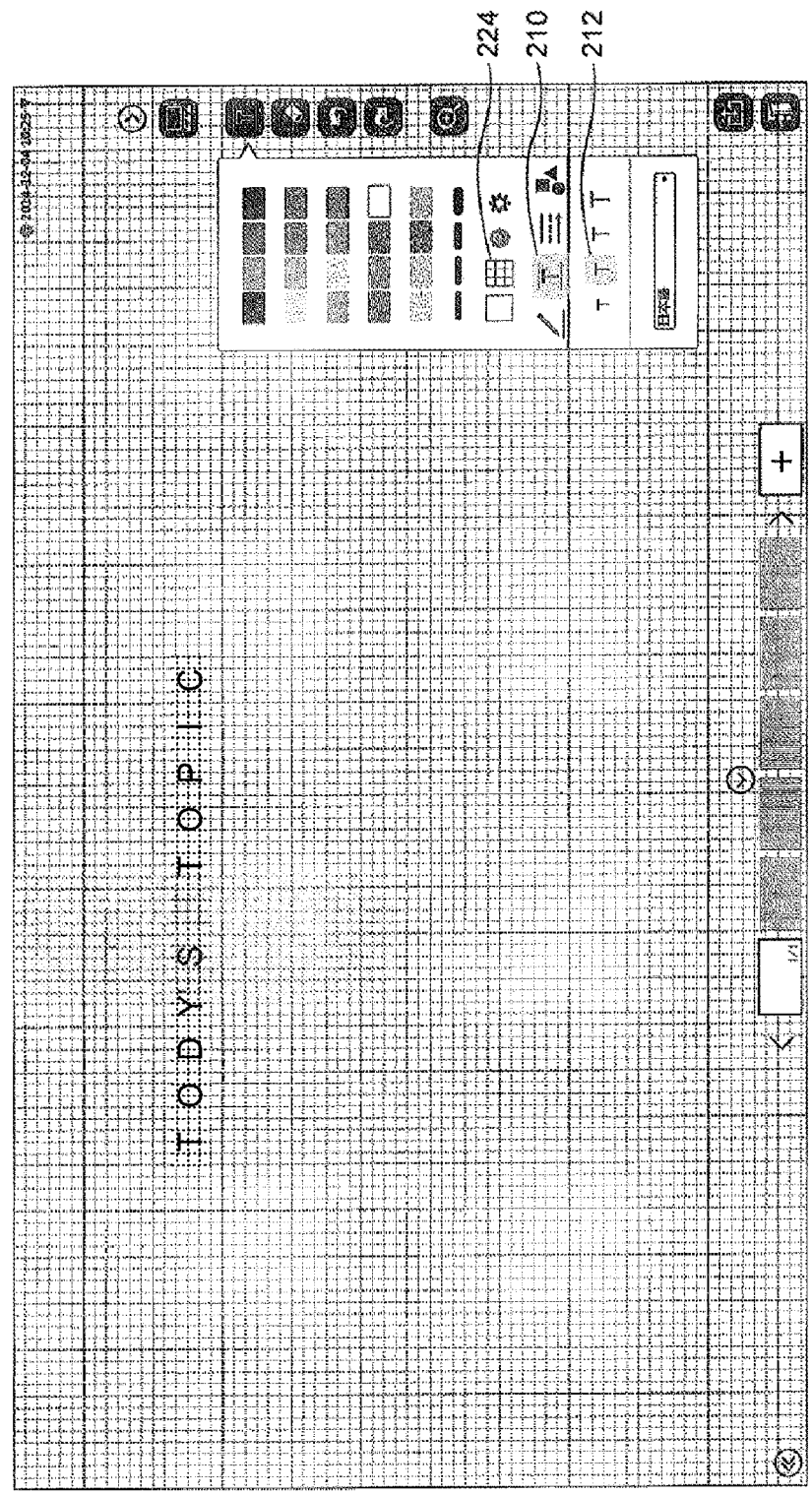

[Fig. 27]
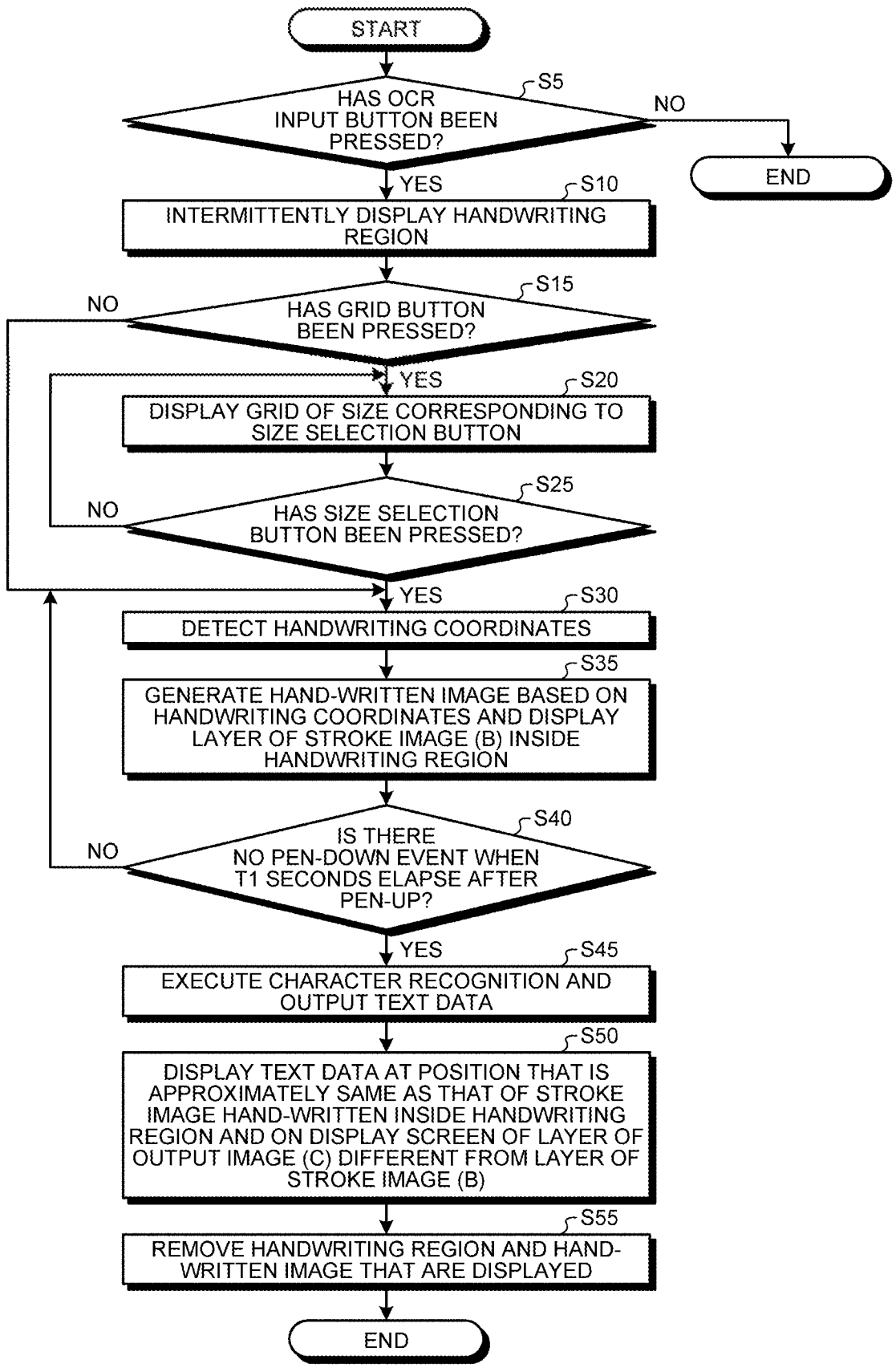

ELECTRONIC INFORMATION BOARD APPARATUS, INFORMATION PROCESSING METHOD, AND COMPUTER PROGRAM PRODUCT

CROSS-REFERENCE TO RELATED APPLICATIONS

The present application is a continuation application of International Application No. PCT/JP2016/000207, filed Jan. 15, 2016, which claims priority to Japanese Patent Application No. 2015-008608, filed Jan. 20, 2015. The contents of these applications are incorporated herein by reference in their entirety.

BACKGROUND OF THE INVENTION

1. Field of the Invention

The present invention relates to a technique providing an input supporting function that is appropriate when hand-written characters and symbols written in an electronic information board apparatus are recognized as characters.

2. Description of the Related Art

Conventionally, in conferences held in companies, educational institutes, administrative organizations, and the like, electronic black boards on which a background image is displayed on a display, and a user can draw a stroke image of a character, a number, a diagram, and the like on the background image are used.

As an example of such an electronic black board, in Japanese Patent No. 5625615, a technique having an object to make it possible to display both hand-written contents and continuously-displayed contents without degrading the visibility of both the contents when a hand-writing input is made on the constantly-displayed contents displayed on the front-most face of an electronic information board apparatus has been disclosed in which a search for a blank area capable of housing the display contents is performed based on the size of the display contents, the search size is decreased in a case where the search is not successful, the decreasing of the size is repeated until a search succeeds, and the display contents are moved to a found blank area so as to be displayed therein.

However, in a conventional electronic black board, a stroke image of a text, a symbol, or the like written on the display screen by a user using his hand cannot be converted to a text directly using an OCR recognition process.

For this reason, it is conceivable to use an OCR function that is supported as a standard in Windows (registered trademark) 7 that is one of operating systems OS mounted in computer systems by using a computer apparatus connected to the electronic black board.

However, since being capable of editing, storing, and reading a stroke image that is directly written by a user using his hand on the screen are significant features of the electronic black board, it takes time to execute OCR input through a tablet PC input panel mounted in a tablet PC connected to the electronic black board, and thus, there is a problem in that user's ease of use is lowered.

In addition, in a case where a plurality of characters, symbols, and/or the like are written on an electronic black board using the hand, depending on a user who has written them, there is a case where the sizes of characters are not uniform or a case where the direction of the character string is upward or downward. For this reason, when character recognition of such an image is executed, it is supposed that the recognition accuracy decrease.

Thus, when character recognition of a stroke image of a character, a symbol, or the like written on the screen of an electronic black board by using the hand is executed so as to convert to a text, there is an earnest desire for the provision of a support function capable of improving the ease of use at the time of handwriting and improving the input accuracy of a stroke image that is a target for the character recognition.

SUMMARY OF THE INVENTION

According to one aspect of the present invention, an electronic information board apparatus includes a guide generating unit, a coordinate detecting unit, an image drawing unit, a character recognizing unit, and a display superimposing unit. The guide generating unit is configured to display a handwriting region on a screen. The coordinate detecting unit is configured to detect coordinates of an indication body moving in the handwriting region on the screen. The image drawing unit is configured to generate a stroke image based on the coordinates and display the generated stroke image in the handwriting region on a first layer of the screen. The character recognizing unit is configured to execute character recognition based on a hand-written image that is hand-written inside the handwriting region and outputs text data. The display superimposing unit is configured to display the text data acquired from the character recognizing unit at a position that is approximately the same as that of the hand-written image that is hand-written inside the handwriting region on the screen, and on a second layer of the screen different from the first layer.

BRIEF DESCRIPTION OF THE DRAWINGS

FIG. 1 is a whole configuration diagram of an image processing system according to an embodiment;

FIG. 2 is a hardware configuration diagram of an electronic black board;

FIG. 3 is a functional block diagram of an electronic black board;

FIG. 4 is a functional block diagram of a file processing unit;

FIG. 5 is a functional block diagram of a server unit and a transmission control unit;

FIG. 6 is a conceptual diagram that illustrates page data;

FIG. 7 is a conceptual diagram that illustrates stroke data;

FIG. 8 is a conceptual diagram that illustrates coordinate array data;

FIG. 9 is a conceptual diagram that illustrates media data;

FIG. 10 is a conceptual diagram that illustrates a remote license management table;

FIG. 11 is a conceptual diagram that illustrates an address book management table;

FIG. 12 is a conceptual diagram that illustrates backup data;

FIG. 13 is a conceptual diagram that illustrates a connection destination management table;

FIG. 14 is a conceptual diagram that illustrates a participating base management table;

FIG. 15 is a conceptual diagram that illustrates operation data;

FIG. 16 is a configuration diagram of each image layer;

FIG. 17 is a sequence diagram that illustrates the process of each electronic black board;

FIG. 18 is a sequence diagram that illustrates the process of each electronic black board;

FIG. 19 is a diagram that illustrates a detailed configuration of a stroke processing unit and an UI image generating unit illustrated in FIG. 3;

FIG. 20 is a diagram that illustrates an example of a UI image displayed on a display;

FIG. 21 is a diagram that illustrates an example of the screen at the time of pressing a size selection button illustrated in FIG. 20;

FIG. 22 is a diagram that illustrates a case where a grid display button is pressed, and a grid is displayed;

FIG. 23 is a diagram that illustrates a case where the grid display button is not pressed, and the grid is in a non-display state;

FIG. 24A is a diagram that illustrates an example of a modification of a handwriting region;

FIG. 24B is a diagram that illustrates an example of a modification of a handwriting region;

FIG. 25 is a diagram that illustrates that an OCR process is executed and text data representing a result of character recognition is displayed;

FIG. 27 is a flowchart that illustrates the operation of an electronic information board apparatus according to an embodiment of the present invention.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 26:
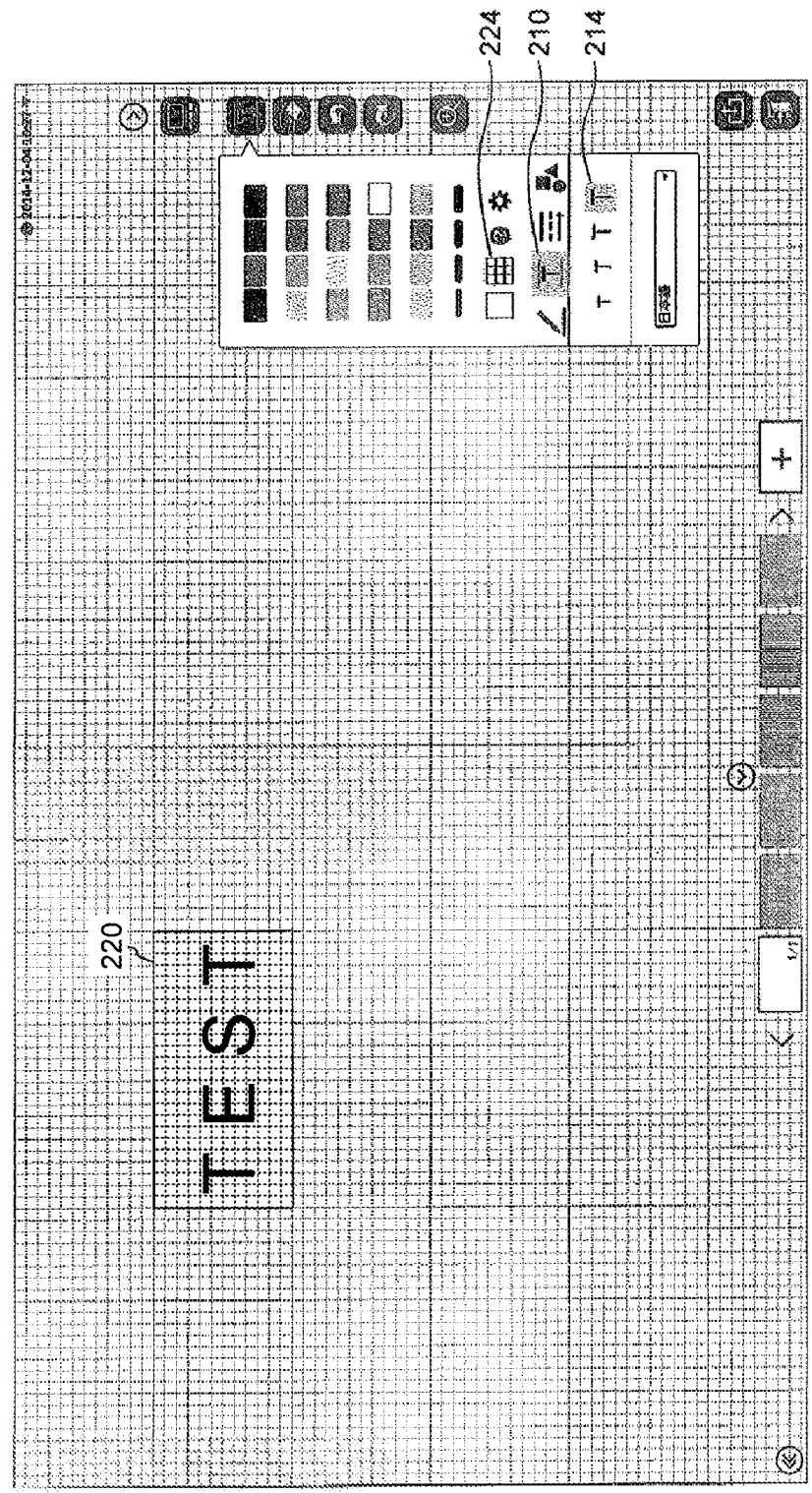
FIG. 26 is a diagram that illustrates an example in which a grid is also displayed at the time of OCR input illustrated in FIGS. 20 and 21.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, an embodiment of the present invention will be described with reference to the drawings.

An embodiment has an object to improve the ease of use at the time of handwriting and improve the input accuracy of a stroke image that is a target for character recognition.

In order to improve the ease of use at the time of handwriting and improve the accuracy of character recognition, the present invention employs the following configuration.

An electronic information board apparatus according to the present invention includes: a coordinate detecting means that detects the coordinates of an indication body moving in a handwriting region of a screen; and an image drawing means that generates a stroke image based on the coordinates and displays the generated stroke image in the handwriting region.

By employing such a configuration, the ease of use at the time of handwriting can be improved, and the input accuracy of a stroke image that is a target for character recognition can be improved.

Hereinafter, the features of the present invention will be described in detail with reference to the drawings.

<Overview of System>

FIG. 1 is a whole configuration diagram of an image processing system according to this embodiment. For the simplification of description, only two electronic black boards 2a and 2b, electronic pens 4a and 4b accompanying thereto, and the like are illustrated in FIG. 1, three or more of electronic black boards, electronic pens, and the like may be used.

As illustrated in FIG. 1, the image processing system 1 includes: a plurality of electronic black boards 2a and 2b; a plurality of electronic pens 4a and 4b; USB memories 5a and 5b; notebook PCs (personal computers) 6a and 6b; television (video) conference terminals 7a and 7b; and a PC 8. The electronic black boards 2a, 2b, and the PC 8 are communicably interconnected through a communication network 9. In the plurality of electronic black boards 2a and 2b, displays 3a and 3b are arranged, respectively.

The electronic black board 2a can display an image drawn according to an event (a touch of a pen tip of the electronic pen 4a or a pen head of the electronic pen 4a onto the display 3a) occurring according to the electronic pen 4a on the display 3a. In addition, the image displayed on the display 3a can be changed based on not only the electronic pen 4a but also an event (a gesture of enlargement, reduction, page skipping, or the like) occurring according to a user's hand Ha or the like.

The USB memory 5a can be connected to the electronic black board 2a, and the electronic black board 2a can read an electronic file of a PDF or the like from the USB memory 5a, or the electronic black board 2a can record an electronic file in the USB memory 5a. In addition, the notebook PC 6a is connected to the electronic black board 2a through a cable 10a1 enabling communication compliant to a standard such as DisplayPort, DVI (Digital Visual Interface), HDMI (registered trademark) (High-Definition Multimedia Interface) or VGA (Video Graphics Array). The electronic black board 2a generates an event in accordance with a touch onto the display 3a and transmits, similar to an event supplied from an input device such as a mouse or a keyboard, event information representing this event to the notebook PC 6a. In the same manner, the television (video) conference terminal 7a is connected to the electronic black board 2a through a cable 10a2 enabling communication according to the standard described above. The notebook PC 6a and the television conference terminal 7a may communicate with the electronic black board 2a based on radio communication compliant to various radio communication protocols such as Bluetooth (registered trademark) and the like.

On the other hand, at another base at which the electronic black board 2b is installed, similar to the description presented above, the electronic black board 2b including the display 3b, the electronic pen 4b, the USB memory 5b, the notebook PC 6b, the television conference terminal 7b, a cable 10b1, and a cable 10b2 are used. In addition, an image displayed on the display 3b can be changed based on an event occurring according to a user's hand Hb or the like.

In this way, an image drawn on the display 3a of the electronic black board 2a at one base is displayed also on the display 3b of the electronic black board 2b at another base. To the contrary, an image drawn on the display 3b of the electronic black board 2b at another base is displayed on the display 3a of the electronic black board 2a at the one base. As above, since the image processing system 1 can execute a remote sharing process for sharing the same image at remote places, it is convenient to use the image processing system for a conference held at a remote place or the like.

Hereinafter, in a case where an arbitrary electronic black board among the plurality of electronic black boards is to be represented, it will be represented as an "electronic black board 2". In a case where an arbitrary display among a plurality of displays is to be represented, it will be represented as a "display 3". In addition, in a case where an arbitrary electronic pen among the plurality of electronic pens is to be represented, it will be represented as an "electronic pen 4". In a case where an arbitrary USB memory among a plurality of USB memories is to be represented, it will be represented as a "USB memory 5". In a case where an arbitrary notebook PC among a plurality of notebook PCs is to be represented, it will be represented as a "notebook PC 6". In a case where an arbitrary television conference terminal among a plurality of television conference terminals is to be represented, it will be represented as a "television conference terminal 7". In addition, in a case where an arbitrary hand of a plurality of user's hands is to be represented, it will be represented as a "Hand H". In a case where an arbitrary cable among a plurality of cables is to be represented, it will be represented as a "cable 10".

In this embodiment, while an electronic black board will be described as an example of an image processing apparatus, the image processing apparatus is not limited thereto. Other examples of the image processing apparatus include an electronic signboard (digital signage), a telestrator used for a sport, a weather forecast, or the like, a remote image (video) diagnosis device, and the like. In addition, while the notebook PC 6 will be described as an example of an information processing terminal, the information processing terminal is not limited thereto. Thus, other examples of the information processing terminal include a desktop PC, a tablet PC, a PDA, a digital video camera, a digital camera, and a terminal capable of supplying an image frame such as a gaming device. In addition, the communication network includes the Internet, a LAN (Local Area Network), a mobile telephone network, and the like. In this embodiment, while the USB memory will be described as an example of a recording medium, the recording medium is not limited thereto. Thus, as another example of the recording medium, various recording media such as an SD card and the like may be used.

<Hardware Configuration of Electronic Black Board>

Subsequently, the hardware configuration of an electronic black board according to this embodiment will be described with reference to FIG. 2. FIG. 2 is a hardware configuration diagram of the electronic black board.

As illustrated in FIG. 2, the electronic black board 2 includes: a CPU 101 that controls the overall operation of the electronic black board 2; ROM 102 that stores programs used for driving the CPU 101 such as an IPL; RAM 103 that is used as a work area of the CPU 101; an SSD 204 that stores various kinds of data of programs used for the electronic black board 2 and the like; a network controller 105 that controls communication with the communication network 9; and an external storage controller 106 that controls communication with the USB memory 5. In addition, the electronic black board 2 includes: a capture device 111 that displays video information on a display of the notebook PC 6 as a still image or a moving image; a GPU (Graphics Processing Unit) 112 that is specialized in handling graphics; and a display controller 105 that controls and manages a screen display for outputting an output image output from the GPU to the display 3 or the television conference terminal 7.

In addition, the electronic black board 2 includes: a sensor controller 114 that controls the process of a touch sensor 115; and a touch sensor 115 that detects a touch of the electronic pen 4, the user's hand H, or the like onto the display 3. This touch sensor 115 inputs coordinates and detects coordinates by using an infrared grid system. A method for inputting coordinates and detecting coordinates is a method in which two light receiving/emitting devices (not illustrated in the drawings) disposed at both upper end portions of the display 3 emit a plurality of infrared rays in parallel with the display 3, and rays reflected by a reflection member disposed on the periphery of the display 3 and returning on the same optical path as the optical path of the rays emitted by a light emitting device are received. The touch sensor 115 outputs IDs (Identification) of infrared rays emitted by the two light receiving/emitting devices that are screened by an object to the sensor controller 114, and the sensor controller 114 specifies a coordinate position that is a touch position of the object. Each of all the IDs represented below is an example of identification information.

The touch sensor 115 is not limited to the infrared grid system, and various detecting means such as a touch panel of an electrostatic capacitive system specifying a touch position by detecting a change in the electrostatic capacitance, a touch panel of a resistance film type specifying a touch position based on changes in the voltages of two resistance films facing each other, a touch panel of an electromagnetic induction system specifying a touch position by detecting electromagnetic induction occurring according to a touch of a touch object onto the display unit, and the like may be used.

In addition, the electronic black board 2 includes an electronic pen controller 116. This electronic pen controller 116 determines presence/absence of a touch of a pen tip or a touch of a pen head onto the display 3 by communicating with the electronic pen 4. The electronic pen controller 116 may be configured to determine presence/absence of a touch of not only the pen tip or the pen head of the electronic pen 4 but also a portion of the electronic pen 4 held by the user, or any other portion of the electronic pen.

Furthermore, the electronic black board 2 includes a bus line 120 such as an address bus or a data bus, as illustrated in FIG. 2, used for electrically connecting the CPU 101, the ROM 102, the RAM 103, the SSD 104, the network controller 105, the external storage controller 106, the capture device 111, the GPU 112, the sensor controller 114, and the electronic pen controller 116. A program used for the electronic black board 2 may be recorded on a computer-readable recording medium such as a CD-ROM and be circulated.

<Functional Configuration of Electronic Black Board>

Subsequently, the functional configuration of the electronic black board will be described with reference to FIGS. 3 to 16. First, the overall functional configuration of the electronic black board 2 will be described with reference to FIG. 3. FIG. 3 is a functional block diagram of the electronic black board. The electronic black board 2 includes each functional configuration illustrated in FIG. 3 in accordance with the hardware configuration illustrated in FIG. 2 and programs. The electronic black board 2 can serve not only as a "hosting apparatus" starting a remote sharing process but also as a "participating apparatus" participating in a remote sharing process that has already been started.

Basically, the electronic black board 2 is configured by both a client unit 20 and a server unit 90. The client unit 20 and the server unit 90 are functions that are realizes inside one casing of the electronic black board 2. In a case where the electronic black board 2 serves as a hosting apparatus, the client unit 20 and the server unit 90 are realized in this electronic black board 2.

On the other hand, in a case where the electronic black board 2 serves as a participating apparatus, in this electronic black board 2, while the client unit 20 is realized, the server unit 90 is not realized. In other words, in the configuration illustrated in FIG. 1, in a case where the electronic black board 2a serves as a hosting apparatus, and the electronic black board 2b serves as a participating apparatus, the client unit 20 of the electronic black board 2a communicates with the client unit 20 of the other electronic black board 2b through the server unit 90 realized inside the same electronic black board 2a. On the other hand, the client unit 20 of the electronic black board 2b communicates with the client unit of the other electronic black board 2a through the server unit 90 realized inside the other electronic black board 2a.

[Functional Configuration of Client Unit 20]

Subsequently, the functional configuration of the client unit 20 will be described with reference to mainly FIGS. 3 to 5. The client unit 20 includes: a video acquiring unit 21; a coordinate detecting unit 22; an automatic adjustment unit 23; a touch detecting unit 24; an event distributing unit 25; an operation processing unit 26; a gesture processing unit 27; a video superimposing unit 28; an image processing unit 30; and a communication control unit 60.

Among these, the video acquiring unit 21 acquires output video of video output equipment connected to the cable 10. When an image signal is received from the video output equipment, the video acquiring unit 21 derives image information such as the resolution of an image frame that is a display image of the video output equipment formed by this image signal and an update frequency of this image frame by analyzing this image signal and outputs the image information to the image acquiring unit 31.

The coordinate detecting unit 22 detects the coordinate position of an event (a user's operation of touching onto the display 3 using the hand H or the like) generated by the user on the display 3. In addition, the coordinate detecting unit 22 also detects a touched area.

The automatic adjustment unit 23 is started up at the time of starting up the electronic black board 2 and adjusts the parameter of image processing of a sensor camera according to the optical sensor system of the touch sensor 115 such that the touch sensor 115 can output an appropriate value to the coordinate detecting unit 22.

The touch detecting unit 24 detects an event (an operation of pressing (touching) the pen tip of the electronic pen 4 or the pen head of the electronic pen 3 onto the display 3) generated by the user.

The event distributing unit 25 distributes the coordinate position of an event detected by the coordinate detecting unit 22 and a detection result detected by the touch detecting unit 24 into each event of stroke drawing, an UI operation, and a gesture operation.

Here, the "stroke drawing" is an event, in a case where a stroke image (B), which will be described later, illustrated in FIG. 16 is displayed on the display 3, until a user presses the electronic pen 4 onto the display 3 and moves the electronic pen 4 in the pressed state and then finally separates the electronic pen 4 from the display 3. According to such stroke drawing, for example, an alphabet "S", "T", or the like is drawn on the display 3. In this "stroke drawing", not only an event of drawing an image but also an event of erasing an image that has already been drawn or editing a drawn image is included.

The "UI operation" is an event of user's pressing a predetermined position using the electronic pen 4 or the hand H in a case where a UI image (A), which will be described later, illustrated in FIG. 16 is displayed on the display 3. According to this UI operation, for example, the color, the width, and the like, of a line drawn by using the electronic pen 4 are set.

The "gesture operation" is an event of user's touching 3 onto the display 3 using the hand H or moving on the display in a case where the stroke image (B), which will be described later, illustrated in FIG. 16 is displayed on the display 3. According to this gesture operation, for example, by user's moving the hand H in a state in which the hand H is in touch with the display 3, enlargement (or reduction) of an image, a change of the display region, a page change, or the like can be executed.

Based on a determination of a UI operation that is made by the event distributing unit 25, the operation processing unit 26 executes various operations in accordance with an element of the UI for which the event occurs. Examples of the element of the UI include a button, a list, a check box, and a text box.

The gesture processing unit 27 executes an operation corresponding to a determination of a gesture operation that is made by the event distributing unit 25.

The video superimposing unit 28 displays an image superimposed by a display superimposing unit 36 to be described later on video output equipment (the display 3 or the like) as video. In addition, the video superimposing unit 28 executes picture-in-picture of video transmitted from another video output equipment (the television conference terminal 7 or the like) for video from the video output equipment (the notebook PC 6 or the like). Furthermore, the video superimposing unit 28 executes a conversion for displaying video, which is displayed in the form of "picture-in-picture" and is displayed in a part of the display 3, on the whole display 3.

The image processing unit 30 executes a superimposition process of image layers as illustrated in FIG. 16. This image processing unit 30 includes: an image acquiring unit 31; a stroke processing unit 32, a UI image generating unit 33; a background generating unit 34; a layout managing unit 35; a display superimposing unit 36; a page processing unit 37; a file processing unit 40; a page data storing unit 300; and a remote license management table 310.

Among these, the image acquiring unit 31 acquires each frame from the video acquired by the video acquiring unit 21 as an image. The image acquiring unit 31 outputs the data of this image to the page processing unit 37. This image corresponds to an output image (C) output from the video output equipment (the notebook PC 6 or the like) illustrated in FIG. 16.

The stroke processing unit 32 draws an image, erases a drawn image, or edits a drawn image based on an event relating to the stroke drawing into which the event distributing unit 25 distribute. An image according to this stroke drawing corresponds to the stroke image (B) illustrated in FIG. 16. Each of the results of the drawing, the erasing, and the editing of the image based on this stroke drawing is stored in the operation data storing unit 840 as operation data to be described later.

The UI image generating unit 33 generates an UI (user interface) image set in advance for the electronic black board 2. This UI image corresponds to the UI image (A)

illustrated in FIG. 16. The background generating unit 34 receives media data among page data read from the page data storing unit 300 by the page processing unit 37 from the page processing unit 37. The background generating unit 34 outputs the received media data to the display superimposing unit 36. An image of this media data corresponds to a background image (D) illustrated in FIG. 16. The pattern of the background image (D) is a plain pattern, a grid display, or the like.

The layout managing unit 35 manages layout information that represents the layout of each image output from the image acquiring unit 31, the stroke processing unit 32, and the UI image generating unit 33 (or the background generating unit 34) to the display superimposing unit 36. Accordingly, the layout managing unit 35 can indicate positions at which the output image (C) and the stroke image (B) are displayed inside the UI image (A) and the background image (D) or non-display thereof for the display superimposing unit 36.

Based on the layout information output from the layout managing unit 35, the display superimposing unit 36 layouts each of images output from the image acquiring unit 31, the stroke processing unit 32, and the UI image generating unit 33 (background generating unit 34).

The page processing unit 37 arranges data of the stroke image (B) and data of the output image (C) as one unit of page data and stores the arranged data in the page data storing unit 300. The data of the stroke image (B) forms a part of the page data as stroke array data (each stroke data) represented by a stroke array data ID illustrated in FIG. 6. The data of the output image (C) forms a part of the page data as media data represented by a media data ID illustrated in FIG. 6. When this media data is read from the page data storing unit 300, the read data is handled as data of the background image (D).

As the page processing unit 37 transmits the media data included in the page data that has been stored once to the display superimposing unit 36 through the background generating unit 34, the video superimposing unit 28 can redisplay the background image (D) on the display 3. In addition, the page processing unit 37 returns the stroke array data (each stroke data) included in the page data to the stroke processing unit 32, thereby forming a state in which the stroke can be re-edited. Furthermore, the page processing unit 37 can erase or erase the page data.

In other words, the data of the output image (C) displayed on the display 3 at a time point when the page processing unit 37 stores the page data in the page data storing unit 300 is stored in the page data storing unit 300 once, and, thereafter, when the data is read from the page data storing unit 300, the data is read as media data representing the background image (D). Then, the page processing unit 37 outputs stroke array data representing the stroke image (B), which is included in the page data read from the page data storing unit 300, to the stroke processing unit 32. In addition, the page processing unit 37 outputs media data representing the background image (D), which is included in the page data read from the page data storing unit 300, to the background generating unit 34.

The display superimposing unit 36 superimposes the output image (C) supplied from the image acquiring unit 31, the stroke image (B) supplied from the stroke processing unit 32, the UI image (A) supplied from the UI image generating unit 33, and the background image (D) supplied from the background generating unit 34 in accordance with a layout designated by the layout managing unit 35. In this way, as illustrated in FIG. 16, in order in which the images are visible for the user even when the images are superimposed, a configuration of layers of the UI image (A), the stroke image (B), the output image (C), and the background image (D) is formed.

The display superimposing unit 36 may switch between the image (C) and the image (D) illustrated in FIG. 16 such that the images are exclusively superimposed on the image (A) and the image (B). For example, in a case where the cable 10 between the electronic black board 2 and the video output equipment (notebook PC 6 or the like) is disconnected in a state in which the image (A), the image (B), and the image (C) are displayed, it may be configured such that the image (C) is excluded from a superimposition target in accordance with designation made by the layout managing unit 35, and the image (D) is displayed. In such a case, the display superimposing unit 36 also executes enlargement of the display, reduction of the display, and a moving process of the display region.

The page data storing unit 300 stores page data as illustrated in FIG. 6. FIG. 6 is a conceptual diagram that illustrates the page data. The page data is data (stroke array data (each stroke data) and media data) corresponding to one page displayed on the display 3. Since the kinds of parameters included in the page data are many, here, the content of the page data will be described with reference to FIGS. 6 to 9 in a divisional manner.

As illustrated in FIG. 6, in the page data, a page data ID used for identifying an arbitrary one page, start time representing time at which display of this page starts, end time representing time at which the content of the page is not rewritten according to a stroke, a gesture, or the like, a stroke array data ID used for identifying stroke array data generated according to the stroke of the electronic pen 4 or the user's hand H, and a media data ID used for identifying media data are stored in association with each other. The stroke array data is data for displaying the stroke image (B), which is illustrated in FIG. 16, to be described later on the display 3. The media data is data for displaying the background image (D), which is illustrated in FIG. 16, to be described later on the display 3.

According to such page data, for example, in a case where a user draws an alphabet "S" using the electronic pen 4, single-stroke writing is made, and the alphabet "S" having one stroke data ID is displayed. However, in a case where a user draws an alphabet "T" using the electronic pen 4, two-stroke writing is made, and the alphabet "T" of one character having two stroke data IDs is displayed.

The stroke array data, as illustrated in FIG. 7, represents detailed information. FIG. 7 is a conceptual diagram that illustrates stroke array data. As illustrated in FIG. 7, one stroke array data is represented by a plurality of units of stroke data. In one unit of stroke data, a stroke data ID used for identifying this stroke data, start time representing the start time of writing of one stroke, end time representing the end time of writing of one stroke, a color of the stroke, a width of the stroke, and a coordinate array data ID used for identifying the array of passing points of the stroke are represented.

This coordinate array data, as illustrated in FIG. 8, illustrates detailed information. FIG. 8 is a conceptual diagram that illustrates the coordinate array data. As illustrated in FIG. 8, the coordinate array data represents information of one point (X coordinate value, Y coordinate value) on the display 3, difference time (ms) from the start time of the stroke of passing this one point, and a writing pressure of the electronic pen 4 at this one point. In other words, a collection of one points illustrated in FIG. 8 represents one unit of the coordinate array data illustrated in FIG. 7. For example, in a case where a user draws an alphabet "S" using the electronic pen 4, while one-stroke writing is made, a plurality of passing points are passed until the end of drawing of "S", and accordingly, the coordinate array data represents information of the plurality of passing points.

The media data included in the page data illustrated in FIG. 6 represents detailed information as illustrated in FIG. 9. FIG. 9 is a conceptual diagram that illustrates the media data. As illustrated in FIG. 9, in the media data, a media data ID included in the page data illustrated in FIG. 6, a data type of the media data, recording time at which the page data is stored in the page data storing unit 300 from the page processing unit 37, a position (X coordinate value, Y coordinate value) of an image displayed on the display 3 based on the page data and the size (width, height) of the image, and data representing the content of the media data are represented in association with each other. Among these, the position of an image displayed on the display 3 based on the page data represents the position of the upper left end of the image displayed based on the page data in a case where the coordinates (X coordinate value, Y coordinate value) of the upper left end of the display 3=(0, 0).

Referring back to FIG. 3, the remote license management table 310 manages license data that is necessary for executing the remote sharing process. In this remote license management table 310, as illustrated in FIG. 10, a product ID of the electronic black board 3, a license ID used for authentication, and the validity period of the license are managed in association with each other.

(Functional Configuration of File Processing Unit 40)

Subsequently, the functional configuration of the file processing unit 40 illustrated in FIG. 3 will be described with reference to FIG. 4. FIG. 4 is a functional block diagram of the file processing unit.

The file processing unit 40 includes: a recovery unit 41; a file input unit 42a; a file output unit 42b; a file converting unit 43; a file transmitting unit 44; an address book input unit 45; a backup processing unit 46; a backup output unit 47; a setting managing unit 48; a setting file input unit 49a; and a setting file output unit 49b. In addition, the file processing unit 40 includes: an address book management table 410; a backup data storing unit 420; a setting file storing unit 430; and a connection destination management table 440.

Among these, the recovery processing unit 41, after the electronic black board 2 abnormally ends (ABEND), detects an abnormal end (ABEND) and recovers page data that has not been stored. For example, in case of a normal end, the page data is recorded in the USB 5 through the file processing unit 40 as a PDF file. However, in case of an abnormal end (ABEND) due to shutdown of power or the like, the page data is maintained to be recorded in the page data storing unit 300. For this reason, when the power is turned on again, the recovery processing unit 41 recovers the page data by reading the page data from the page data storing unit 300.

The file input unit 42a reads a PDF file from the USB memory 5 and stores each page in the page data storing unit 300 as page data.

The file converting unit 43 converts page data stored in the page data storing unit 300 into a file having a PDF format.

The file output unit 42b records the PDF file output by the file converting unit 42 in the USB memory 5.

The file transmitting unit 44 transmits the PDF file generated by the file converting unit 43 by attaching it to an electronic mail. The transmission destination of this file represents the content of the address book management table 410 on the display 3 by using the display superimposing unit 36 and is determined as the file transmitting unit 44 receives a selection of the destination in accordance with a user's operation of an input device such as a touch panel. In the address book management table 410, as illustrated in FIG. 11, the name of the destination and the mail address of the electronic mail of the destination are managed in association with each other. The file transmitting unit 44 may be configured to receive an input of a mail address as the destination in accordance with a user's operation of an input device such as a touch panel.

The address book input unit 45 reads a list file of electronic mail addresses from the USB memory 5 and manages the electronic mail addresses in the address book management table 410.

The backup processing unit 46 stores a file output by the file output unit 42b and a file transmitted by the file transmitting unit 44 in the backup data storing unit 420, thereby backing up the files. In a case where a backup has not been set by the user, the backup process is not executed. The backup data, as illustrated in FIG. 12 is stored in the PDF format.

The backup output unit 47 stores backup files in the USB memory 5. At the time of executing this storage process, a password is input according to a user's operation of an input device such as a touch panel for the security.

The setting managing unit 48 manages various kinds of setting information of the electronic black board 2 by storing/reading the information in/from the setting file storing unit 430. Examples of the various kinds of setting information include a network setting, a date and time setting, a setting of a region and a language, a setting of a mail server, a setting of an address book, a setting of a connection destination list, and a setting relating to the backup. The network setting, for example, is a setting of an IP address of the electronic black board 2, a setting of a net mask, a setting of a default gateway, a setting of a DNS (Domain Name System), or the like.

The setting file output unit 49b records various kinds of setting information of the electronic black board 2 in the USB memory 5 as a setting file. The user cannot see the content of the setting file based on the security.

The setting file input unit 49a reads the setting file stored in the USB memory 5 and reflects the various kinds of setting information on various settings of the electronic black board.

The address book input unit 50 reads a list file of connection destination IP addresses of the remote sharing process from the USB memory 5 and manages the list file in the connection destination management table 440. As illustrated in FIG. 13, in a case where the electronic black board 2 is a participating apparatus to participate in a remote sharing process, the connection destination management table 440 is a table used for managing IP addresses in advance so as to reduce an effort of a user using the participating apparatus for inputting the IP address of an electronic black board achieving the role of the hosting apparatus. In this connection destination management table 440, the name of a base at which the electronic black board 2 as a hosting apparatus capable of accepting participation is installed and the IP address of the electronic black board 2 as the hosting apparatus are managed in association with each other. The connection destination management table 440 may not be present. However, in such a case, a user using the participating apparatus, in order to start a remote request process for the hosting apparatus, needs to input the IP address of the hosting apparatus using an input device such as a touch panel. For this reason, the user using the participating apparatus acquires the IP address of the hosting apparatus from the user using the hosting apparatus through a telephone call, an electronic mail, or the like.

(Functional Configuration of Communication Control Unit 60)

Next, the functional configuration of the communication control unit 60 will be described with reference to FIG. 5.

The communication control unit 60 controls communication with another electronic black board 2 through the communication network 9 or communication with a communication control unit 70, which will be described later, of the server unit 90. For this reason, the communication control unit 60 includes: a remote start processing unit 61; a remote participation processing unit 62; a remote image transmitting unit 63; a remote image receiving unit 64; a remote image transmitting unit 63; a remote operation receiving unit 66; and a participation base management table 610.

Among these, the remote start processing unit 61 requests to newly start a remote sharing process from the server unit 90 of the same electronic black board 2 and receives a result of the request from the server unit 90. In this case, the remote start processing unit 61 refers to the remote license management table 310 and, in a case where the license information (a product ID, a license ID, and a validity period) is managed, can make a request for starting a remote sharing process. However, in a case where the license information is not managed, a request for starting a remote sharing process cannot be made.

In a case where the electronic black board is a hosting apparatus, the participation base management table 610 is a table that manages an electronic black board as a participating apparatus currently participating in a remote sharing process. In this participation base management table 610, as illustrated in FIG. 14, the name of the base at which the participating electronic black board 2 is installed and the IP address of the electronic black board 2 are managed in association with each other.

The remote participation processing unit 62 requests the remote connection request receiving unit 71 of the server unit 90 of the electronic black board 2 as a hosting apparatus that has already started a remote sharing process through the communication network 9 to participate in the remote sharing process. Also in this case, the remote participation processing unit 62 refers to the remote license management table 310. In addition, in a case where the remote participation processing unit 62 participates in a remote sharing process that has already been started, the remote participation processing unit 62 acquires the IP address of the electronic black board 2 as a participation destination by referring to the connection destination management table 440. The IP address of the electronic black board 2 as the participation destination may be input in accordance with a user's operation of an input device such as a touch panel without referring to the connection destination management table by using the remote participation processing unit 62.

The remote image transmitting unit 63 transmits the output image (C) transmitted form the video acquiring unit 21 through the image acquiring unit 31 to the server unit 90.

The remote image receiving unit 64, from the server unit 90, receives image data supplied from video output equipment connected to another electronic black board 2 and outputs the received image data to the display superimposing unit 36, thereby enabling a remote sharing process.

The remote operation transmitting unit 65 transmits various kinds of operation data that is necessary for the remote sharing process to the server unit 90. Examples of the various kinds of operation data include data relating to addition of a stroke, erase of a stroke, editing of a stroke (enlargement, reduction, or moving), storage of page data, generation of page data, copy of page data, erase of page data, conversion of a displayed page, and the like. In addition, the remote operation receiving unit 66 receives operation data input to another electronic black board 2 from the server unit 90 and outputs the received operation data to the image processing unit 30, thereby executing a remote sharing process.

[Functional Configuration of Server Unit]

Subsequently, the functional configuration of the server unit 90 will be described with reference to FIG. 5. The server unit 90 is disposed in each electronic black board 2, and any electronic black board 2 can achieve the role of the server unit. For this reason, the server unit 90 includes a communication control unit 70 and a data managing unit 80.

(Functional Configuration of Communication Control Unit 70)

Next, the functional configuration of the communication control unit 70 will be described with reference to FIG. 5.

The communication control unit 70 controls communication with the communication control unit 70 of the client unit 20 disposed inside the same electronic black board 2 and the communication control unit 70 of the client unit 20 disposed inside another electronic black board 2 through the communication network 9. The data managing unit 80 manages operation data, image data, and the like.

Described in more detail, the communication control unit 70 includes: a remote connection request receiving unit 71; a remote connection result transmitting unit 72; a remote image receiving unit 73; a remote image transmitting unit 74; a remote operation receiving unit 75; and a remote operation transmitting unit 75.

Among these, the remote connection request receiving unit 71 receives a remote sharing process starting request from the remote start processing unit 61 or receives a participation request for a remote sharing process that is transmitted from the remote participation processing unit 62. The remote connection result transmitting unit 72 transmits a result of the remote sharing process starting request to the remote start processing unit 61 or transmits a result of the participation request for the remote sharing process to the remote participation processing unit 62.

The remote image receiving unit 73 receives image data (data of the output image (C)) transmitted from the remote image transmitting unit 63 and transmits the received image data to a remote image processing unit 82 to be described later. The remote image transmitting unit 74 receives image data from the remote image processing unit 82 and transmits this image data to the remote image receiving unit 64.

The remote operation receiving unit 75 receives operation data (data of the stroke image (B) or the like) transmitted from the remote operation transmitting unit 65 and transmits the received operation data to a remote operation processing unit 83 to be described later. The remote operation transmitting unit 76 receives operation data from the remote operation processing unit 83 and transmits this operation data to the remote operation receiving unit 66.

(Functional Configuration of Data Managing Unit)

Next, the functional configuration of the data managing unit 80 will be described with reference to FIG. 5.

The data managing unit 80 includes: a remote connection processing unit 81; a remote image processing unit 82; a remote operation processing unit 83; an operation synthesis processing unit 84; and a page processing unit 85. In addition, the server unit 90 includes: a passcode managing unit 810; a participation base management table 820; an image data storing unit 830; an operation data storing unit 840; and a page data storing unit 850.

Among these, the remote connection processing unit 81 starts a remote sharing process and ends the remote sharing process. In addition, the remote connection processing unit 81 checks presence or absence of a license and whether it is within a period of the license based on license information received together with the remote sharing process starting request from the remote start processing unit 61 by the remote connection request receiving unit 71 or license information received together with a participation request of the remote sharing process transmitted from the remote participation processing unit 62. In addition, the remote connection processing unit 81 checks whether the number of participation requests from other electronic black boards 2 as client units does not exceed an allowed participation number set in advance.

Furthermore, the remote connection processing unit 81 determines whether or not a passcode transmitted when a participation request for a remote sharing process from another electronic black board 2 is made is the same as a passcode managed by the passcode managing unit 810. In a case where the passcodes are the same, the remote connection processing unit 81 permits the participation in the remote sharing process. This passcode is issued by the remote connection processing unit 81 when a remote sharing process is newly started and is delivered to a user using an electronic black board 2 as a participating apparatus to participate in the remote sharing process from a user using the electronic black board 2 as a hosting apparatus through a telephone call, an electronic mail, or the like. In this way, the user using the participating apparatus who desires to participate in the remote sharing process makes a participation request by inputting the passcode to the participating apparatus using an input device such as a touch panel, and accordingly, the participation is permitted. By weighting more on user's ease of use than the security, only the license condition may be checked with the checking of the passcode being omitted.

In a case where the electronic black board 2 is a hosting apparatus, the remote connection processing unit 81 stores participation base information included in the participation request transmitted from the remote participation processing unit 62 of the participating apparatus through the communication network 9 in the participation base management table 820 of the server unit 90. Then, the remote connection processing unit 81 reads the remote base information stored in the participation base management table 820 and transmits the read remote base information to the remote connection result transmitting unit 72. The remote connection result transmitting unit 72 transmits the remote base information to the remote start processing unit 61 of the client unit 20 of the same hosting apparatus. The remote start processing unit 61 stores the remote base information in the participation base management table 610. In this way, the hosting apparatus manages the remote base information in both the client unit 20 and the server unit 90.

The remote image processing unit 82 receives image data (output image (C)) transmitted from the video output equipment (notebook PC 6 or the like) connected to the client unit (including the client unit of the own electronic black board that is a hosting apparatus) of each electronic black board 2 that is in the middle of the remote sharing process and stores the received image data in the image data storing unit 830 and determines the display order of the image data to be processed in the remote sharing process in the order of time at which the image data arrives at the server unit 90 of the own electronic black board 2 that is a hosting apparatus. In addition, the remote image processing unit 82 transmits the image data in the order determined as above to the client units 20 (including the client unit of the electronic black board that is a hosting apparatus) of all the electronic black boards 2 that are in the middle of the participation in the remote sharing process through the communication control unit 70 (remote image transmitting unit 74) by referring to the participation base management table 820.

The remote operation processing unit 83 receives various kinds of operation data (the stroke image (B) and the like) such as a stroke image drawn in the client unit (including the client unit of the own electronic black board that is a hosting apparatus) of each electronic black board 2 that is in the middle of the remote sharing process and determines the display order of images to be processed in the remote sharing process in order of time at which the operation data arrives at the server unit 90 of the own electronic black board 2 that is a hosting apparatus. The various kinds of operation data is the same as the various kinds of operation data described above. In addition, the remote operation processing unit 83 transmits the operation data to the client units 20 (including the client unit of the own electronic black board that is a hosting apparatus) of all the electronic black boards 2 that are in the middle of the remote sharing process by referring to the participation base management table 820.

The operation synthesis processing unit 84 synthesizes the operation data of the electronic black boards 2 output from the remote operation processing unit 83 and stores operation data that is a result of the synthesis in the operation data storing unit 840 and returns the operation data to the remote operation processing unit 83.

This operation data is transmitted from the remote operation transmitting unit 76 to the client unit of the electronic black board that is a hosting apparatus and the client unit of the electronic black board that is a participating apparatus, whereby an image relating to the same operation data is displayed in each electronic black board 2. For this reason, in the operation data, as illustrated in FIG. 15, an EQ (Sequence), an operation name of the operation data, an IP address and a port no. of the client unit (server unit) of the electronic black board 2 that is the transmission source of the operation data, an IP address and a port no. of the client unit (server unit) of the electronic black board 2 that is the transmission destination of the operation data, the operation type of the operation data, an operation target of the operation data, and data representing the content of the operation data are represented in association with each other.

For example, in SEQ1, when a stroke is drawn by the client unit (port no.: 50001) of the electronic black board (IP address: 192.0.0.1) that is a hosting apparatus, it is illustrated that the operation data is transmitted to the server unit (port no.: 50000) of the electronic black board (IP address: 192.0.0.1) that is the same hosting apparatus.

In this case, the operation type is "STROKE", the operation target is a page data ID p005", and the data representing the content of the operation data is data representing the stroke. In SEQ2, it is illustrated that the operation data is transmitted from the server unit (port No.: 50000) of the electronic black board (IP address: 192.0.0.1) that is a hosting apparatus to the client unit (port, No.: 50001) of another electronic black board (IP address: 192.0.0.1) that is a participating apparatus.

The operation synthesis processing unit 84 synthesizes the operation data in order in which the operation data is input to the operation synthesis processing unit 84. Thus, when the communication network 9 is not congested, the stroke image (B) is displayed on the displays 3 of all the electronic black boards 2 that are in the middle of the remote sharing process in order of user's strokes for the electronic black boards 2. The page processing unit 85 has a function similar to the page processing unit 37 of the image processing unit 30 of the client unit 20, and, also in the server unit 90, the page data illustrated in FIGS. 6 to 8 is stored in the page data storing unit 850. The content of the page data storing unit 850 is the same as that of the page data storing unit 300 of the image processing unit 30, and thus, description thereof will not be presented.

<Process or Operation According to Embodiment>

Subsequently, the process or the operation according to this embodiment will be described with reference to FIGS. 17 and 18. FIGS. 17 and 18 are sequence diagrams illustrating the process of each electronic black board. In the embodiment illustrated in FIGS. 17 and 18, a case will be described in which an electronic black board 2a achieves the role of a hosting apparatus (a server unit and a client unit) hosting a remote sharing process, and electronic black boards 2b and 2c achieve the role of a participating apparatus (client unit) participating in the remote sharing process. Here, displays 3a, 3b, and 3c are connected to the electronic black boards 2a, 2b and 2c, and notebook PCs 6a, 6b, and 6c are connected thereto, respectively. In addition, electronic pens 4a, 4b, and 4c are used in the electronic black boards 2a, 2b, and 2c, respectively.

(Participation Process)

First, the process for the electronic black boards 2b and 2c to participate in a remote sharing process will be described with reference to FIG. 17.

When a user turns on the power switch of the electronic black board 2a, the client unit 20 of the electronic black board 2a is started up. Then, when the user executes an operation for starting up the server unit 90 using an input device such as a touch panel, an instruction for starting the process of the server unit 90 is output from the remote start processing unit 61 of the client unit 20 to the remote connection request receiving unit 71 of the server unit 90 of the same electronic black board 2a. In this way, in the electronic black board 2a, not only the client unit 20 but also the server unit 90 can start various processes (Step S21).

Next, the UI image generating unit 33 of the client unit 20 of the electronic black board 2a generates connection information used for setting up a connection with the electronic black board 2a and displays the connection information acquired by the video superimposing unit 28 from the UI image generating unit 28 through the display superimposing unit 36 on the display 3a (Step S22). In this connection information, the IP address of the hosting apparatus and a passcode used for the remote sharing process of this time are included. In this case, the passcode stored in the passcode managing unit 810 is read by the remote connection processing unit 81 illustrated in FIG. 5 and is sequentially transmitted to the remote connection result transmitting unit 72 and the remote start processing unit 61. In addition, the passcode is transmitted from the communication control unit 60 including the remote start processing unit 61 to the image processing unit 30 illustrated in FIG. 3 and is finally input to the UI image generating unit 33. In this way, the passcode is included in the connection information. Then, the connection information can be conveyed to the users using the electronic black boards 2b and 2c by the user using the electronic black board 2a through a telephone call or an electronic mail. It is noted that, in a case where the connection destination management table 440 is present, even when the IP address of the hosting apparatus is not included in the connection information, the participating apparatus can make a participation request.

Next, in each of the electronic black boards 2b and 2c, when an input of the connection information is received in accordance with a user's operation using an input device such as a touch panel, the remote participation processing unit 62 of the client unit 20 of each of the electronic black boards 2a and 2b transmits the passcode to the communication control unit 70 of the server unit 90 of the electronic black board 2a based on the IP address of the connection information through the communication network 9, thereby making a participation request (Steps S23 and S24). In this way, the remote connection request receiving unit 71 of the communication control unit 70 receives a participation request (including a passcode) from each of the electronic black boards 2b and 2c and outputs this passcode to the remote connection processing unit 81.

Next, the remote connection processing unit 81 authenticates the passcode received from each of the electronic black boards 2b and 2c by using the passcode managed by the passcode managing unit 810 (Step S25). Then, the remote connection result transmitting unit 72 notifies the client unit 20 of each of the electronic black boards 2b and 2c a result of the authentication (Steps S26 and S27). In a case where each of the electronic black boards 2b and 2c is determined to be a valid electronic black board through the authentication process of Step S25, communication of the remote sharing process between the electronic black board 2a that is a hosting apparatus and each of the electronic black boards 2b and 2c that are participating apparatuses is set up, and the remote participation processing unit 62 of the client unit 20 of each of the electronic black boards 2b and 2c enables the start of the remote sharing process with each of the other electronic black boards (Steps S28 and S29).

(Display of Output Image)

Subsequently, the process of displaying the output image (C) in the remote sharing process will be described with reference to FIG. 17.

First, the electronic black board 2b displays the output image (C) on the display 3b (Step S30). More specifically, the image acquiring unit 31 of the electronic black board 2b receives data of the output image (C) displayed on the notebook PC 6b from the notebook PC 6b through the video acquiring unit 21 and transmits the received data to the display 3b through the display superimposing unit 36 and the video superimposing unit 28, whereby the display 3b displays the output image (C).

Next, the image processing unit 30 including the image acquiring unit 31 of the electronic black board 2b transmits the data of the output image (C) to the remote image transmitting unit 63, and accordingly, the communication control unit 60 including the remote image transmitting unit 63 transmits the data of the output image (C) to the communication control unit 70 of the electronic black board 2a that is a hosting apparatus through the communication network 9 (Step S31). In this way, the remote image receiving unit 73 of the electronic black board 2a receives the data of the output image (C) and outputs the received data to the remote image processing unit 82, and accordingly, the remote image processing unit 82 stores the data of the output image (C) in the image data storing unit 830.

Next, the electronic black board 2a that is a hosting apparatus displays the output image (C) on the display 3a

(Step S32). More specifically, the remote image processing unit 82 of the electronic black board 2a outputs the data of the output image (C) received from the remote image receiving unit 73 to the remote image transmitting unit 74. The remote image transmitting unit 74 outputs the data of the output image (C) to the remote image receiving unit 64 of the client unit 20 of the electronic black board 2a that is the same hosting apparatus. The remote image receiving unit 64 outputs the data of the output image (C) to the display superimposing unit 36. The display superimposing unit 36 outputs the data of the output image (C) to the video superimposing unit 28. The video superimposing unit 28 outputs the data of the output image (C) to the display 3a. In this way, the display 3a displays the output image (C). Next, the communication control unit 70 including the remote image transmitting unit 74 of the server unit 90 of the electronic black board 2a as a hosting apparatus transmits the data of the output image (C) to the communication control unit 60 of the electronic black board 2c other than the electronic black board 2b that is a transmission source of the data of the output image (C) through the communication network 9 (Step S33). In this way, the remote image receiving unit 64 of the electronic black board 2c that is a participating apparatus receives the data of the output image (C).

Next, the electronic black board 2c displays the output image (C) on the display 3c (Step S34). More specifically, the remote image receiving unit 64 of the electronic black board 2c outputs the data of the output image (C) received in Step S33 described above to the display superimposing unit 36 of the electronic black board 2c. The display superimposing unit 36 outputs the data of the output image (C) to the video superimposing unit 28. The video superimposing unit 28 outputs the data of the output image (C) to the display 3c. Accordingly, the display 3c displays the output image (C).

In a case where not only the data of the output image (C) but also data of the UI image (A) and data of the stroke image (B) are input to the display superimposing unit 28, a superimposed image (A, B, C) is generated by the display superimposing unit 36, and the video superimposing unit 28 outputs data of the superimposed image (A, B, C) to the display 3c. In addition, in a case where data of a television conference video (E) is transmitted to the video superimposing unit 28 from the television conference terminal 7, the video superimposing unit 28 superimposes the data of the television conference video (E) on the superimposed image (A, B, C) in a picture-in-picture manner and outputs resultant data to the display 3c.

(Display of Superimposed Image)

Subsequently, the process of displaying a superimposed image in the remote sharing process will be described with reference to FIG. 18.

First, in the electronic black board 2b, the user draws the stroke image (B) on the electronic black board 2b by using the electronic pen 4b (Step S41).

Next, the display superimposing unit 36 of the electronic black board 2b, as illustrated in FIG. 16, superimposes the stroke image (B) on the UI image (A) and the output image (C), and the video superimposing unit 28 displays the superimposed image (A, B, C) on the display 3b of the electronic black board 2b (Step S42). More specifically, the stroke processing unit 32 of the electronic black board 2b receives the data of the stroke image (B) as operation data from the coordinate detecting unit 21 and the touch detecting unit 24 through the event distributing unit 25 and transmits the received data to the display superimposing unit 36. In this way, the display superimposing unit 36 can superimpose the stroke image (B) on the UI image (A) and the output image (C), and the video superimposing unit 28 can display the superimposed image (A, B, C) on the display 3b of the electronic black board 2b.

Next, the image processing unit 30 including the stroke processing unit 32 of the electronic black board 2b transmits the data of the stroke image (B) to the remote operation transmitting unit 65, and accordingly, the remote operation transmitting unit 65 of the electronic black board 2b transmits the data of the stroke image (B) to the communication control unit 70 of the electronic black board 2a that is a hosting apparatus through the communication network 2 (Step S43). In this way, the remote operation receiving unit 75 of the electronic black board 2a receives the data of the stroke image (B) and outputs the received data to the remote operation processing unit 83, and accordingly, the remote operation processing unit 83 outputs the data of the stroke image (B) to the operation synthesis processing unit 84. In this way, the data of the stroke image (B) drawn on the electronic black board 2b is sequentially transmitted to the remote operation processing unit 83 of the electronic black board 2a that is the hosting apparatus when the stroke image is drawn. The data of this stroke image (B) is data represented for each stroke data ID illustrated in FIG. 7. Thus, for example, as described above, in a case where the user draws the alphabet "T" using the electronic pen 4, two-stroke writing is made, and accordingly, the data of the stroke images (B) represented by two stroke data IDs is sequentially transmitted.

Next, the electronic black board 2a that is the hosting apparatus displays the superimposed image (A, B, C) in which the data of the stroke image (B) transmitted from the electronic black board 2b is included on the display 3a (Step S44). More specifically, the operation synthesis processing unit 84 of the electronic black board 2a synthesizes the data of a plurality of stroke images (B) sequentially transmitted through the remote operation processing unit 83 and stores synthesized data in the operation data storing unit 840 and returns the synthesized data to the remote operation processing unit 83. In this way, the remote operation processing unit 83 outputs the data of the stroke images (B) after the synthesis, which has been received from the operation synthesis processing unit 84 to the remote operation transmitting unit 76. The remote operation transmitting unit 76 outputs the data of the stroke images (B) after the synthesis to the remote operation receiving unit 66 of the client unit 20 of the electronic black board 2a that is the same hosting apparatus. The remote operation receiving unit 66 outputs the data of the stroke images (B) after the synthesis to the display superimposing unit 36 of the image processing unit 30. Thus, the display superimposing unit 36 superimposes the stroke image (B) after the synthesis on the UI image (A) and the output image (C). Finally, the video superimposing unit 28 displays the superimposed image (A, B, C) superimposed by the display superimposing unit 36 on the display 3a.

Next, the communication control unit 70 including the remote operation transmitting unit 76 of the server unit 90 of the electronic black board 2a as the hosting apparatus transmits the data of the stroke images (B) after the synthesis to the communication control unit 60 of the electronic black board 2c other than the electronic black board 2b that is the transmission source of the data of the stroke image (B) through the communication network 9 (in Step S45). In this way, the remote operation receiving unit 66 of the electronic black board 2c that is a participating apparatus receives the data of the stroke images (B) after the synthesis.

Next, the electronic black board 2c displays the superimposed image (A, B, C) on the display 3c (Step S34). More specifically, the remote operation receiving unit 66 of the electronic black board 2c outputs the data of the stroke images (B) after the synthesis received in Step S45 described above to the image processing unit 30 of the electronic black board 2c. The display superimposing unit 36 of the image processing unit 30 superimposes the data of the stroke images (B) after the synthesis on the data of the UI image (A) and the data of the output image (C) and outputs the data of the superimposed image (A, B, C) to the video superimposing unit 28. The video superimposing unit 28 outputs the data of the superimposed image (A, B, C) to the display 3c. In this way, the display 3c displays the superimposed image (A, B, C). In the process described above, while the output image (C) is displayed on the display 3, instead of this output image (C), the background image (D) may be displayed. Furthermore, by relieving the exclusive relation between the output image (C) and the background image (D), both the output image (C) and the background image (D) may be simultaneously displayed on the displayed 3.

(End of Participation)

Subsequently, the process of a participating apparatus ending participation in the remote sharing process will be described with reference to FIG. 18. In the embodiment illustrated in FIG. 18, a process in which the electronic black board 2c ends the participation is illustrated.

First, in the electronic black board 2c, when a participation end request is received according to a user's operation for an input device such as a touch panel, the remote participation processing unit 62 transmits a participation end request to the communication control unit 70 of the server unit 90 of the electronic black board 2a as the hosting apparatus (Step S47). Accordingly, the remote connection request receiving unit 71 of the communication control unit 70 receives the participation end request from the electronic black board 2c and outputs the participation end request to the remote connection processing unit 81 together with the IP address of the electronic black board 2c. Then, the remote connection processing unit 81 of the electronic black board 2a, based on the IP address transmitted from the remote connection request receiving unit 71, deletes the IP address of the electronic black board 2c that has transmitted the participation end request and the name of the base at which the electronic black board 2c is installed from the participation base management table 820 and outputs the IP address of the electronic black board 2c and a notification indicating the removal to the remote connection result transmitting unit 72.

Next, the communication control unit 70 including the remote connection result transmitting unit 72 instructs the communication control unit 60 of the client unit 20 of the electronic black board 2c to end the participation through the communication network 9 (Step S48). Accordingly, the remote participation processing unit 62 of the communication control unit 60 of the electronic black board 2c executes a participation ending process by disconnecting the communication of the remote sharing process, whereby the participation ends (Step S49).

FIG. 19 is a diagram that illustrates a detailed configuration of the stroke processing unit 32 and the UI image generating unit 33 illustrated in FIG. 3.

The stroke processing unit 32 illustrated in FIG. 19 includes a stroke OCR processing unit 322.

As described above, the stroke processing unit 32, based on an event relating to stroke drawing into which the event distributing unit 25 distribute, draws an image, erases a drawn image, or edits a drawn image. In addition to this, the stroke OCR processing unit 322, based on an event relating to stroke drawing into which the event distributing unit 25 distributes, executes an OCR process of a drawn image and outputs a text.

In order to improve the recognition accuracy of an OCR input, the stroke OCR processing unit 322 displays a handwriting region (FIG. 22) in a part of the inside of the screen by using the OCR guide generating unit 333 and converts an image representing a character and/or a symbol that are hand-written in the handwriting region into a text. The stroke OCR processing unit 322 may use a handwriting recognition engine (Ink API) produced by Microsoft Corp. used as a tablet PC input panel, for example, as a handwriting recognition engine for the OCR.

The UI image generating unit 33 illustrated in FIG. 19 includes: a grid generating unit 332 and an OCR guide generating unit 333.

As described above, the UI image generating unit 33 generates a UI (user interface) image set on the electronic black board 2 in advance. This UI image corresponds to a UI image (A) illustrated in FIG. 20. The UI image generating unit 33 generates connection information used for setting up a connection with the electronic black board 2a, and the video superimposing unit 28 displays the connection information acquired from the UI image generating unit 33 through the display superimposing unit 36 on the display 3a.

The grid generating unit 332 generates a grid having a size set in advance and displays the connection information acquired through the display superimposing unit 36 on the display 3a. The grid generating unit 332 generates vertical lines and horizontal lines having predetermined gaps therebetween on the display screen as the grid and displays the grid.

The OCR guide generating unit 333 generates a handwriting region such that the handwriting region is aligned with the vertical lines and the horizontal lines of the grid. The OCR guide generating unit 333 generates the handwriting region such that the handwriting region is aligned with the vertical lines and the horizontal lines of the grid also in a case where the size of the handwriting region is changed to a different size. The OCR guide generating unit 333, in order to support a user's input operation at the time of OCR input, generates a handwriting region enabling an input of a handwriting trajectory using an indication body on a part of the display screen and displays the connection information acquired through the display superimposing unit 36 on the display 3a.

FIG. 20 is a diagram that illustrates an example of the UI image displayed on the display 3.

When a tool button 202 arranged inside a tool bar 200 illustrated in FIG. 20 is pressed, a tool box 204 is displayed as the UI image (A). As illustrated in FIG. 20, in the tool box 204, an OCR input button 210, a size 1 selection button 211, a size 2 selection button 212, a size 3 selection button 213, and a size 4 selection button 214 are displayed.

When the OCR input button 210 is pressed, a handwriting region is generated by the OCR guide generating unit 333, and a handwriting region 220 (FIG. 22) surrounded by an outer frame is displayed on the screen. When handwriting is made according to a user's pen operation inside the handwriting region 220, a stroke image representing a character and/or a symbol is drawn in a layer of this stroke image (B) in accordance with this handwriting, and, in a case where a pen-down event has not occurred even when T1 seconds elapsed after a pen-up event occurs, the stroke OCR processing unit 322 converts a stroke image representing a character and/or a symbol that has been handwritten inside the handwriting region 220 into a text.

The size of the text is selected by pressing the size 1 selection button 211, the size 2 selection button 212, the size 3 selection button 213, or the size 4 selection button 214. In the case illustrated in FIG. 20, the size 2 is selected. When an input mode (for example, a handwriting mode) other than the OCR is selected, the handwriting region 220 becomes in a non-display state.

FIG. 21 is a diagram that illustrates an example of the screen at the time of pressing the size 4 selection button 214 illustrated in FIG. 20. Among the grid size selection buttons illustrated in FIG. 20, the size 1 is minimal, and the size 4 is maximal. In the case illustrated in FIG. 21, the handwriting region is enlarged according to the size of the text. The size of the handwriting with respect to a text is a fixed value, and, drawing is made, each time when a button for selecting each size is pressed, in a size corresponding to the button.

In order to improve the recognition accuracy at the time of OCR input, it is necessary to make handwriting input inside the handwriting region. For this reason, in a case where the OCR input button 210 is pressed, and the handwriting region 220 is displayed by the OCR guide generating unit 333, the user is made to recognize the presence of the handwriting region 220 by displaying the handwriting region in an animated manner. In other words, the OCR guide generating unit 333 may repeat display and non-display of the outer frame representing the outer periphery of the handwriting region 220.

In this way, by alternately repeating the display and the non-display of the handwriting region 220, it is possible to attract the user's attention to the handwriting region 220 at the time of handwriting. For this reason, the ease of use at the time of handwriting can be improved, and the input accuracy of a stroke image that is a target for a subsequent character recognition process can be improved.

FIG. 22 is a diagram that illustrates a case where the grid display button 224 is pressed, and the grid is displayed.

When the grid display button 224 is pressed, a grid 228 (FIG. 22) is generated on the screen by the grid generating unit 332 and is displayed by the display superimposing unit 36. On the other hand, when the grid non-display button 226 is displayed, as illustrated in FIG. 23, the grid is made to be in a non-display state by the grid generating unit 332.

In addition, when the handwriting button 230 is pressed, a state in which a hand-written stroke can be input to the handwriting region 220 is reached.

In the state illustrated in FIG. 20, when the OCR input button 210 is pressed, as illustrated in FIG. 22, the handwriting region 220 and the grid are simultaneously displayed. At this time, in a case where the grid crosses the handwriting region 220, it is difficult to view the handwriting region 220 and the grid, and there are cases where the user cannot accurately input a hand-written stroke inside the handwriting region 220, and, as a result, the recognition accuracy of the OCR is lowered.

FIGS. 24A and 24B are diagrams that illustrate examples of modifications of the handwriting region.

The handwriting region 220, generally, as illustrated in FIG. 24A, may be displayed to have equal widths. However, the handwriting region used for the OCR input represents the outer edge line of an input region, and accordingly, the handwriting region is not limited to be displayed to have equal widths. For example, in case of Japanese or Chinese, there are cases where a region elongated in the vertical direction enables easy input.

FIG. 24B illustrates an example of a case where the aspect ratio of the size of the handwriting region 220 is set as 3:2. In the example illustrated in FIG. 24B, when the size 1 is one unit (for example, a region in which handwriting corresponding to one character can be made) of the handwriting region, the handwriting region 220a has 3:2 as a ratio of the vertical width and the horizontal width. In a handwriting region 220b (size 2), a handwriting region 220c (size 3), and a handwriting region 220d (size 4), the sizes are set to two times, three times, and four times of the size 1, respectively. For the handwriting regions 220a to 220d, internal areas each having a rectangular shape are set as the handwriting regions.

The handwriting regions 220a to 220d are arranged so as to be aligned with (not cross) the vertical lines and the horizontal lines of the grid, and a frame portion representing the outer periphery of the handwriting region 220 is displayed to have a thickness larger than that of the grid lines, and handwriting in the internal area of the handwriting region 220 is urged.

The grid generating unit 332 generates and displays vertical lines and horizontal lines having predetermined gaps therebetween as a grid on the display screen, and the guide generating unit 332 generates the handwriting region 220 such that the handwriting region 220 is aligned with the vertical lines and the horizontal lines of the grid. In this way, it is possible to attract the user's attention to a grid disposed inside the handwriting region 220 at the time of handwriting. For this reason, the ease of use at the time of handwriting can be improved, and the input accuracy of a stroke image that is a target for a subsequent character recognition process can be improved.

The OCR guide generating unit 333 generates the handwriting region 220 such that the handwriting region 220 is aligned with the vertical lines and the horizontal lines of the grid also in case where the size of the handwriting region 220 is changed to a different size, and accordingly, it is possible to attract the user's attention to the grid disposed inside the handwriting region 220 at the time of handwriting. For this reason, the ease of use at the time of handwriting can be improved, and the input accuracy of a stroke image that is a target for a subsequent character recognition process can be improved.

Also in a case where a gap between the vertical lines of the grid and a gap between the horizontal lines are changed to respective different gaps by the grid generating unit 332, the OCR guide generating unit 333 can generate the handwriting region 220 such that the handwriting region 220 is aligned with the vertical lines and the horizontal lines of the grid. In this way, regardless of whether the gap between the vertical lines of the grid and the gap between the horizontal lines are changed to respective different gaps, it is possible to attract the user's attention to the grid disposed inside the handwriting region 220 at the time of handwriting. For this reason, the ease of use at the time of handwriting can be improved, and the input accuracy of a stroke image that is a target for a subsequent character recognition process can be improved.

In addition, since the handwriting region 220 is an internal area having a rectangular shape, the handwriting region 220 along the vertical direction and the horizontal direction of the display screen is formed. For this reason, the ease of use at the time of handwriting can be improved, and the input accuracy of a stroke image that is a target for a subsequent character recognition process can be improved.

FIG. 25 is a diagram that illustrates that characters "today's topic" are hand-written inside the handwriting region, and then the OCR process is executed, and text data representing a result of character recognition is displayed.

FIG. 26 is a diagram that illustrates an example in which grids are also displayed at the time of OCR input illustrated in FIGS. 20 and 21. Since outer edge lines of the handwriting region having the size 1 and the size 2 do not cross the grid, the handwriting region and the grids can be easily viewed together, and, as a result, the user can efficiently execute handwriting input.

Although not illustrated in the drawing, by displaying the handwriting region and the grid according to the rule described above, the handwriting region can be displayed to be aligned with the grid also in the size 2 and the size 3.

FIG. 27 is a flowchart that illustrates the operation of an electronic information board apparatus according to an embodiment of the present invention.

First, in Step S5, the event distributing unit 25 determines whether or not the OCR input button 210 has been pressed. In a case where the OCR input button has been pressed, the process proceeds to Step S10.

Next, in Step S10, the OCR guide generating unit 333 sets the handwriting region 220 to an intermittent display mode for intermittently displaying the handwriting region 220. Accordingly, the OCR guide generating unit 333 alternately repeats the display and the non-display of the handwriting region 220.

Next, in Step S15, the event distributing unit 25 determines whether or not the grid display button 224 has been pressed. In a case where the grid display button 224 is pressed, the process proceeds to Step S20. On the other hand, in a case where the grid display button 224 has not been pressed, the process proceeds to Step S30.

In Step S20, a grid having a size according to the size selection button is displayed.

Next, in Step S25, the event distributing unit 25 determines whether or not the size selection button has been pressed. In a case where the size selection button has been pressed, the process is returned to Step S20. On the other hand, in a case where the size selection button has not been pressed, the process proceeds to Step S30.

In Step S30, the handwriting coordinates as the operation data are detected from the coordinate detecting unit 22 and the touch detecting unit 24 through the event distributing unit 25. At this time, the user draws the stroke image (B) on the electronic black board 2b by using the electronic pen 4b.

In Step S35, based on the handwriting coordinates, a hand-written image is generated and is displayed in a layer of the stroke image (B) inside the handwriting region. In other words, the display superimposing unit 36, as illustrated in FIG. 16, superimposes the stroke image (B) on the UI image (A) and the output image (C), and the video superimposing unit 28 displays the superimposed image (A, B, C) on the display 3 of the electronic black board 2. More specifically, the stroke processing unit 32 of the electronic black board 2 receives the data of the stroke image (B) as the operation data from the coordinate detecting unit 21 and the touch detecting unit 24 through the event distributing unit 25 and transmits the data to the display superimposing unit 36. In this way, the display superimposing unit 36 can superimpose the stroke image (B) on the UI image (A) and the output image (C), and the video superimposing unit 28 can display the superimposed image (A, B, C) on the display 3 of the electronic black board 2.

In this way, the handwriting region 220 enabling the input of a handwriting trajectory using the indication body in a part of the display screen is displayed, the handwriting coordinates of the indication body moving inside the handwriting region 220 are detected, and a stroke image is generated based on the handwriting coordinates and is displayed inside the handwriting region 220. In this way, the ease of use at the time of handwriting can be improved, and the input accuracy of a stroke image that is a target for a subsequent character recognition process can be improved.

Next, in Step S40, the stroke OCR processing unit 322 determines whether or not a state in which a pen-down event has not occurred even when T1 seconds elapsed after a pen-up event occurs as the event acquired from the event processing unit 25 is reached. In a case where a pen-down event occurs before the elapse of T1 seconds after the pen-up event, the process is returned to Step S30, and the process described above is repeated. As the T1 seconds, a value acquired through experiments may be set as a default value as an optimal value, and the value may be changed according to the user's need.

On the other hand, in a case where a pen-down event has not occurred even when the T1 seconds elapsed after the pen-up event, the process proceeds to Step S45.

In Step S45, the stroke OCR processing unit 322 executes character recognition of the stroke image (B) drawn inside the handwriting region 220 and outputs a text data to the display superimposing unit 36.

In Step S50, the display superimposing unit 36 converts the text data into a character image corresponding to the text data and displays the character image at approximately the same position as the hand-written image that is hand-written inside the handwriting region 220 and on a display screen of a layer of the output image (C) different from the layer of the stroke image (B).

In Step S55, the display superimposing unit 36 deletes the handwriting region 220 displayed in the layer of the UI image (A) of the display screen and the hand-written image displayed in the layer of the stroke image (B).

In this way, character recognition is executed based on the hand-written image that is hand-written inside the handwriting region 220, text data is output, and the text data is displayed at approximately the same position as a hand-written image that is hand-written inside the handwriting region 220 and on the display screen of a layer different from the layer of the hand-written image. Accordingly, the display position of the text data that is a result of the character recognition can be adjusted to approximately the same position as the hand-written image, and the display accuracy of the text data can be improved.

In this way, in a case where the text data is displayed on the display screen, the handwriting region 220 displayed on the display screen is deleted, and the hand-written image displayed on the display screen is deleted. Accordingly, only the text data is displayed at the position inside the deleted handwriting region 220, and the ease of use at the time of handwriting can be improved.

As above, in a case where a handwriting region is displayed at the time of the OCR input, an animated display is executed in which the outer edge line of the handwriting region is repeatedly and alternately displayed and not displayed. Accordingly, it is possible to attract the user's attention to the handwriting region, and to urge the user to write a handwriting stroke inside the handwriting region. As a result, the recognition accuracy at the time of converting the handwriting stroke into a text can be improved.

Also in a case where the size of the handwriting region is changed, by setting the vertical and horizontal sizes such that the outer edge line of the handwriting region and the grid are aligned with each other, the visibility of the outer edge line of the handwriting region and the grid is improved, and, as a result, the recognition accuracy at the time of converting the handwriting stroke image into a text and the ease of use at the time of handwriting can be improved.

<Configuration, Action, and Effect of Exemplary Embodiment of Present Invention>

<First Aspect>

An electronic black board 2 (electronic information board apparatus) according to this embodiment includes: a coordinate detecting unit 22 (coordinate detecting means) that detects handwriting coordinates of an indication body moving in a handwriting region of a screen; and a display superimposing unit 36 (image drawing means) that generates a stroke image based on the handwriting coordinates and displays the generated stroke image inside the handwriting region 220.

According to this aspect, the handwriting region 220 enabling the input of a handwriting trajectory using the indication body is displayed in a part of the display screen, the handwriting coordinates of the indication body moving inside the handwriting region 220 are detected, and a stroke image is generated based on the handwriting coordinates and is displayed inside the handwriting region 220. Accordingly, the ease of use at the time of handwriting can be improved, and the input accuracy of a stroke image that is a target for the subsequent character recognition process can be improved.

<Second Aspect>

The handwriting region 220 according to this aspect is repeatedly and alternately displayed and not displayed.

According to this aspect, by alternately repeating the display and the non-display of the handwriting region 220, it is possible to attract the user's attention to the handwriting region 220 at the time of handwriting. For this reason, the ease of use at the time of handwriting can be improved, and the input accuracy of a stroke image that is a target for a subsequent character recognition process can be improved.

<Third Aspect>

An electronic black board 2 (electronic information board apparatus) according to this aspect generates vertical lines and horizontal lines having predetermined gaps therebetween as a grid on the display screen, and the handwriting region 220 is generated such that the handwriting region 220 is aligned with the vertical lines and the horizontal lines of the grid.

According to this aspect, the vertical lines and the horizontal lines having predetermined gaps therebetween are generated as a grid on the display screen, and the handwriting region 220 is generated such that the handwriting region 220 is aligned with the vertical lines and the horizontal lines of the grid, and accordingly, it is possible to attract the user's attention to the grid inside the handwriting region 220. For this reason, the ease of use at the time of handwriting can be improved, and the input accuracy of a stroke image that is a target for the subsequent character recognition process can be improved.

<Fourth Aspect>

The handwriting region 220 according to this aspect is generated such that the handwriting region 220 is aligned with the vertical lines and the horizontal lines of the grid also in a case where a size of the handwriting region 220 is changed to a different size.

According to this aspect, also in a case where the size of the handwriting region 220 is changed to a different size, the handwriting region 220 is generated such that the handwriting region 220 is aligned with the vertical lines and the horizontal lines of the grid, and accordingly, it is possible to attract the user's attention to the grid inside the handwriting region 220 at the time of handwriting. For this reason, the ease of use at the time of handwriting can be improved, and the input accuracy of a stroke image that is a target for the subsequent character recognition process can be improved.

<Fifth Aspect>

Regarding the grid according to this aspect, the OCR guide generating unit 333 (guide generating means) generates the handwriting region 220 such that the handwriting region 220 is aligned with the vertical lines and the horizontal lines of the grid also in a case where a gap between the vertical lines and a gap between the horizontal lines are changed to different gaps.

According to this aspect, the handwriting region 220 is generated such that the handwriting region 220 is aligned with the vertical lines and the horizontal lines of the grid also in a case where a gap between the vertical lines and a gap between the horizontal lines of the grid are changed to respective different gaps, and accordingly, regardless of whether the gap between the vertical lines and the gap between the horizontal lines of the grid are changed to respective different gaps, it is possible to attract the user's attention to the grid inside the handwriting region 220 at the time of handwriting. For this reason, the ease of use at the time of handwriting can be improved, and the input accuracy of a stroke image that is a target for the subsequent character recognition process can be improved.

<Sixth Aspect>

An electronic black board 2 (electronic information board apparatus) according to this aspect includes: a stroke OCR processing unit 322 (character recognizing means) that executes character recognition based on a hand-written image that is hand-written inside the handwriting region 220 and outputs text data; and a display superimposing unit 36 (display superimposing means) that displays the text data acquired from the stroke OCR processing unit 322 at a position that is approximately the same as that of the hand-written image that is hand-written inside the handwriting region 220 and on a display screen of a layer different from a layer of the hand-written image.

According to this aspect, character recognition is executed based on the hand-written image that is hand-written inside the handwriting region 220, text data is output, and the text data is displayed at approximately the same position as a hand-written image that is hand-written inside the handwriting region 220 and on the display screen of a layer different from the layer of the hand-written image. Accordingly, the display position of the text data that is a result of the character recognition can be adjusted to approximately the same position as the hand-written image, and the display accuracy of the text data can be improved.

<Seventh Aspect>

In an electronic black board 2 (electronic information board apparatus) according to this aspect, in a case where the text data acquired from the stroke OCR processing unit 322 (character recognizing means) is displayed on the display screen, the handwriting region 220 is deleted, and the hand-written image is deleted.

According to this aspect, in a case where the text data is displayed on the display screen, the handwriting region 220 is deleted, and the hand-written image is deleted. Accordingly, only the text data is displayed at the position inside the deleted handwriting region 220, and the ease of use at the time of handwriting can be improved.

<Eighth Aspect>

There is provided an information processing method using the electronic black board 2 (electronic information board apparatus) according to any one of the first to seventh aspects. The information processing method executes: a guide generating step (S10) of displaying a handwriting region 220 that enables input of a handwriting trajectory using an indication body in a part of a display screen; a coordinate detecting step (S30) of detecting handwriting coordinates of the indication body that moves inside the handwriting region 220; and an image drawing step (S35) of generating a stroke image based on the handwriting coordinates and displaying the generated stroke image inside the handwriting region 220.

According to this aspect, the handwriting region 220 enabling the input of a handwriting trajectory using the indication body is displayed in a part of the display screen, the handwriting coordinates of the indication body moving inside the handwriting region 220 are detected, and a stroke image is generated based on the handwriting coordinates and is displayed inside the handwriting region 220. Accordingly, the ease of use at the time of handwriting can be improved, and the input accuracy of a stroke image that is a target for the subsequent character recognition process can be improved.

<Ninth Aspect>

In this aspect, a processor is made to execute each step described in the eighth aspect.

According to this aspect, it is possible to cause a processor to execute each step.

According to an embodiment, the ease of use at the time of handwriting can be improved, and the input accuracy of a stroke image that is a target for character recognition can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

2 Electronic black board
3 Display
21 Coordinate detecting unit
24 Touch detecting unit
25 Event distributing unit
28 Video superimposing unit
32 Stroke processing unit
33 UI image generating unit
36 Display superimposing unit
200 Tool bar
202 Tool button
204 Tool box
210 OCR input button
211 Size 1 selection button
212 Size 2 selection button
213 Size 3 selection button
214 Size 4 selection button
220 Handwriting region
224 Grid display button
226 Grid non-display button
228 Grid
230 Handwriting button
322 Stroke OCR processing unit
333 OCR guide generating unit
332 Grid generating unit

What is claimed is:

1. An electronic information board apparatus, comprising:
processing circuitry configured to cause display of a handwriting region on a screen; and
a coordinate detecting unit including a touch sensor configured to detect coordinates of an indication body moving in the handwriting region on the screen,
wherein the processing circuitry is further configured to
generate a stroke image based on the detected coordinates and cause display of the generated stroke image in the handwriting region on a first layer of the screen,
execute character recognition based directly on the detected coordinates corresponding to a hand-written image that is hand-written inside the handwriting region, and generate text data, and
cause display of the generated text data at a position that is approximately a same as that of the hand-written image that is hand-written inside the handwriting region on the screen, but on a second layer of the screen different from the first layer, wherein the processing circuitry is further configured to cause the display of the handwriting region to be alternately displayed and not displayed, repeatedly, prior to detecting the coordinates of the indication body.

2. The electronic information board apparatus according to claim 1, wherein the processing circuitry is further configured to generate vertical lines and horizontal lines having predetermined gaps therebetween as a grid on the screen, and generate the handwriting region such that the handwriting region is aligned with the vertical lines and the horizontal lines of the grid.

3. The electronic information board apparatus according to claim 2, wherein the processing circuitry is further configured to generate the handwriting region such that the handwriting region is aligned with the vertical lines and the horizontal lines of the grid also when a size of the handwriting region is changed to a different size.

4. The electronic information board apparatus according to claim 2, wherein the processing circuitry is further configured to generate the handwriting region such that the handwriting region is aligned with the vertical lines and the horizontal lines of the grid also when a gap between the vertical lines and a gap between the horizontal lines of the grid are changed to respective different gaps.

5. The electronic information board apparatus according to claim 1, wherein, when the text data acquired from the processing circuitry is displayed on the screen, the handwriting region is deleted, and the hand-written image is deleted.

6. An information processing method using an electronic information board apparatus, the information processing method comprising:

displaying a handwriting region that enables input of a handwriting trajectory using an indication body in a part of a display screen;

detecting handwriting coordinates of the indication body that moves inside the handwriting region;

generating a stroke image based on the detected handwriting coordinates and displaying the generated stroke image inside the handwriting region on a first layer of the display screen;

executing character recognition based directly on the detected handwriting coordinates corresponding to a hand-written image that is hand-written inside the handwriting region, and generating text data, and causing display of the generated text data at a position that is approximately a same as that of the hand-written image that is hand-written inside the handwriting region on the screen, but on a second layer of the screen different from the first layer, wherein the displaying the handwriting region further causes the display of the handwriting region to be alternately displayed and not displayed, repeatedly, prior to detecting the handwriting coordinates of the indication body.

7. A non-transitory computer-readable medium containing an information processing program, the program causing a computer to perform the method according to claim 6.

8. The electronic information board apparatus of claim 2, wherein the processing circuitry is further configured to display the handwriting region as a rectangle superimposed on the grid, so that the vertical and horizontal lines are visible within the rectangle.

* * * * *